United States Patent
Denton et al.

(10) Patent No.: US 9,823,017 B2
(45) Date of Patent: Nov. 21, 2017

(54) METHOD AND SYSTEM OF CONTROLLING A TEMPERATURE WITHIN A MELT TRAY ASSEMBLY OF A DISTILLATION TOWER

(71) Applicants: Robert D. Denton, Bellaire, TX (US); P. Scott Northrop, Spring, TX (US); Ananda K. Nagavarapu, Houston, TX (US)

(72) Inventors: Robert D. Denton, Bellaire, TX (US); P. Scott Northrop, Spring, TX (US); Ananda K. Nagavarapu, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 234 days.

(21) Appl. No.: 14/876,146

(22) Filed: Oct. 6, 2015

(65) Prior Publication Data

US 2016/0116210 A1    Apr. 28, 2016

Related U.S. Application Data

(60) Provisional application No. 62/067,342, filed on Oct. 22, 2014.

(51) Int. Cl.
*F25J 3/00*     (2006.01)
*F25J 3/02*     (2006.01)
(Continued)

(52) U.S. Cl.
CPC ............ *F25J 3/0233* (2013.01); *B01D 3/166* (2013.01); *F25J 1/0027* (2013.01); *F25J 3/0209* (2013.01);
(Continued)

(58) Field of Classification Search
CPC .. F25J 2200/02; F25J 2200/50; F25J 2200/74; F25J 2200/90; F25J 2205/04;
(Continued)

(56) References Cited

U.S. PATENT DOCUMENTS

| 4,533,372 A | 8/1985 | Valencia et al. ................... 62/12 |
| 4,923,493 A | 5/1990 | Valencia et al. ................... 62/13 |

(Continued)

OTHER PUBLICATIONS

U.S. Appl. No. 14/643,726, P.S. Northrop, filed Mar. 10, 2015.
(Continued)

*Primary Examiner* — Keith Raymond
(74) *Attorney, Agent, or Firm* — ExxonMobil Upstream Research Company — Law Department

(57) ABSTRACT

A method and system of controlling a temperature within a melt tray assembly of a distillation tower. The method may include determining a melt tray fluid composition of a melt tray fluid, determining a melt tray fluid temperature of the melt tray fluid, determining if the melt tray fluid temperature is within an expected melt tray fluid temperature range for the melt tray fluid composition, decreasing the melt tray fluid temperature if the melt tray fluid temperature is greater than an expected melt tray fluid temperature range upper limit, increasing the melt tray fluid temperature if the melt tray fluid temperature is less than an expected melt tray fluid temperature range lower limit, and maintaining the melt tray fluid temperature if the melt tray fluid temperature is within the expected melt tray fluid temperature range.

33 Claims, 10 Drawing Sheets

(51) Int. Cl.
*F25J 3/06* (2006.01)
*F25J 1/00* (2006.01)
*B01D 3/16* (2006.01)
*F25J 3/08* (2006.01)

(52) U.S. Cl.
CPC ........... *F25J 3/0266* (2013.01); *F25J 3/0295* (2013.01); *F25J 3/061* (2013.01); *F25J 3/067* (2013.01); *F25J 3/0635* (2013.01); *F25J 3/08* (2013.01); *F25J 2200/02* (2013.01); *F25J 2200/30* (2013.01); *F25J 2200/50* (2013.01); *F25J 2200/74* (2013.01); *F25J 2200/76* (2013.01); *F25J 2205/20* (2013.01); *F25J 2220/44* (2013.01); *F25J 2220/66* (2013.01); *F25J 2240/30* (2013.01); *F25J 2270/12* (2013.01); *F25J 2270/60* (2013.01); *F25J 2270/66* (2013.01); *F25J 2270/80* (2013.01); *F25J 2270/902* (2013.01); *F25J 2280/02* (2013.01); *F25J 2280/40* (2013.01); *Y02C 10/12* (2013.01)

(58) Field of Classification Search
CPC .... F25J 2205/20; F25J 2210/04; F25J 3/0209; F25J 3/061; F25J 3/0233; F25J 3/0266; F25J 3/067; F25J 3/0635; F25J 2220/66; F25J 2270/902; F25J 2280/40; F25J 2280/50; F25J 2280/02; C10L 3/102; C10L 3/104
See application file for complete search history.

(56) References Cited

U.S. PATENT DOCUMENTS

| | | | |
|---|---|---|---|
| 5,062,270 A | 11/1991 | Haut et al. | 62/12 |
| 5,120,338 A | 6/1992 | Potts, Jr. et al. | 62/12 |
| 5,265,428 A | 11/1993 | Valencia et al. | 62/36 |
| 5,620,144 A | 4/1997 | Strock et al. | 239/557 |
| 5,956,971 A | 9/1999 | Cole et al. | 62/623 |
| 6,053,007 A | 4/2000 | Victory et al. | 62/619 |
| 6,565,629 B1 | 5/2003 | Hayashida et al. | 95/211 |
| 2008/0034789 A1 | 2/2008 | Fieler et al. | 62/623 |
| 2009/0266107 A1 | 10/2009 | Singh et al. | 62/617 |
| 2010/0018248 A1* | 1/2010 | Fieler | F25J 3/0209 62/617 |
| 2010/0107687 A1 | 5/2010 | Andrian et al. | 62/620 |
| 2012/0031144 A1 | 2/2012 | Northrop et al. | 62/617 |
| 2012/0079852 A1* | 4/2012 | Northrop | C07C 7/005 62/620 |
| 2012/0125043 A1 | 5/2012 | Cullinane et al. | 62/620 |
| 2012/0204599 A1 | 8/2012 | Northrop et al. | 62/617 |
| 2012/0279728 A1 | 11/2012 | Northrop et al. | 166/401 |
| 2013/0074541 A1 | 3/2013 | Kaminsky et al. | F25J 1/00 |
| 2013/0098105 A1 | 4/2013 | Northrop | F25J 3/0266 |
| 2014/0137599 A1 | 5/2014 | Oelfke et al. | F25J 3/069 |
| 2014/0338395 A1 | 11/2014 | Oelfke et al. | B01D 53/1418 |
| 2015/0013377 A1* | 1/2015 | Oelfke | B01D 3/36 62/602 |
| 2015/0158796 A1 | 6/2015 | Valencia | C07C 7/05 |
| 2015/0159939 A1 | 6/2015 | Valencia | F25J 1/0022 |
| 2015/0159940 A1 | 6/2015 | Valencia et al. | F25J 1/0022 |
| 2015/0159941 A1 | 6/2015 | Valencia et al. | F25J 3/0209 |
| 2015/0159942 A1 | 6/2015 | Valencia et al. | F25J 3/0209 |
| 2015/0159943 A1 | 6/2015 | Valencia et al. | F25J 3/0233 |
| 2015/0159944 A1 | 6/2015 | Valencia et al. | F25J 3/08 |
| 2015/0159945 A1 | 6/2015 | Valencia et al. | F25J 3/08 |
| 2015/0159946 A1 | 6/2015 | Valencia | F25J 3/08 |
| 2015/0159947 A1 | 6/2015 | Valencia et al. | F25J 3/08 |

OTHER PUBLICATIONS

U.S. Appl. No. 14/661,621, J.S. Valencia, filed Mar. 18, 2015.
U.S. Appl. No. 14/688,786, R.H. Oelfke, filed Apr. 16, 2015.
U.S. Appl. No. 14/700,993, Northrop et al., filed Apr. 30, 2015.
U.S. Appl. No. 14/848,716, N.F. Urbanski, filed Sep. 9, 2015.

* cited by examiner

METHOD AND SYSTEM OF CONTROLLING A TEMPERATURE WITHIN A MELT TRAY ASSEMBLY OF A DISTILLATION TOWER

CROSS REFERENCE TO RELATED APPLICATIONS

This application claims the priority benefit of U.S. patent application Ser. No. 62/067,342, filed Oct. 22, 2014, entitled METHOD AND SYSTEM OF CONTROLLING A TEMPERATURE WITHIN A MELT TRAY ASSEMBLY OF A DISTILLATION TOWER, the entirety of which is incorporated by reference herein.

BACKGROUND

Fields of Disclosure

The disclosure relates generally to the field of fluid separation. More specifically, the disclosure relates to a method and system of controlling a temperature within a melt tray assembly of a distillation tower.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir oftentimes carries with it the incidental production of non-hydrocarbon gases. Such gases include contaminants, such as at least one of carbon dioxide ("$CO_2$"), hydrogen sulfide ("$H_2S$"), carbonyl sulfide, carbon disulfide, and various mercaptans. When a stream being produced from a reservoir includes these contaminants mixed with hydrocarbons, the stream is oftentimes referred to as "sour gas."

Many natural gas reservoirs have relatively low percentages of hydrocarbons and relatively high percentages of contaminants. Contaminants may act as a diluent and lower the heat content of the produced hydrocarbon stream. Additionally, in the presence of liquid water, some contaminants can become corrosive to carbon steel.

It is desirable to remove contaminants from a stream containing hydrocarbons to produce sweet and concentrated hydrocarbons. Specifications for pipeline quality natural gas typically call for a maximum of 2-4% $CO_2$ and ¼ grain $H_2S$ per 100 standard cubic feet (scf) (i.e., 4 parts per million volume (ppmv)) or 5 milligrams per Normal meter cubed (mg/$Nm^3$) $H_2S$). Specifications for lower temperature processes such as natural gas liquefaction plants or nitrogen rejection units typically require less than 50 parts per million (ppm) $CO_2$.

The separation of contaminants from hydrocarbons is difficult and consequently significant work has been applied to the development of hydrocarbon/contaminant separation methods. These methods can be placed into three general classes: absorption by solvents (physical, chemical and hybrids), adsorption by solids, and distillation.

Separation by distillation of some gas mixtures can be relatively simple and, as such, is widely used in the natural gas industry. However, distillation of mixtures of natural gas hydrocarbons, primarily methane, and one of the most common contaminants in natural gas, carbon dioxide, can present significant difficulties. Conventional distillation principles and conventional distillation equipment are predicated on the presence of only vapor and liquid phases throughout the distillation tower. The separation of $CO_2$ from methane by distillation typically involves temperature and pressure conditions that result in solidification of $CO_2$ if a pipeline or better quality hydrocarbon product is desired. The required temperatures are cold temperatures typically referred to as cryogenic temperatures.

Certain cryogenic distillations can overcome the above mentioned difficulties. These cryogenic distillations provide the appropriate mechanism to handle the formation and subsequent melting of solids during the separation of solid-forming contaminants from hydrocarbons. For example, the formation of solid contaminants in equilibrium with vapor-liquid mixtures of hydrocarbons and contaminants at particular conditions of temperature and pressure may take place in a controlled freeze zone section of a distillation tower.

The controlled freeze zone section typically comprises a melt tray assembly that collects and warms solids that form in the controlled freeze zone section. Liquid in the melt tray assembly helps conduct heat to warm the solids and create a liquid slurry. The melt tray assembly provides adequate heat transfer to melt the solids and facilitate liquid slurry draw-off to a stripper section of the distillation tower.

Maintaining the liquid in the melt tray assembly at a steady-state conditions is important for overall process stability within the distillation tower. Too high of a temperature can result in decreased separation performance of the contaminants from the stream containing the hydrocarbons in the controlled freeze zone section, which in turn can result in higher contaminant content in the stream flowing through a rectifier section of the distillation tower and/or can lead to solid formation in the rectifier section. Solid formation in the rectifier section can cause a disruption within the distillation process and prevent adequate removal of the contaminants from the stream. Conversely, too low of a temperature can result in solid formation in the melt tray assembly, which can stop flow of the liquid slurry into the stripper section, thereby disrupting operation within the distillation process. Therefore, a melt tray assembly with unsteady temperatures can negatively affect the rate of removal of contaminants from the stream in the controlled freeze zone section, which may detrimentally affect the purity of the recovered hydrocarbons and may increase the operational costs of the distillation process.

Maintaining the distillation tower in a distillation process in a way such that there is not a sudden change in melt tray assembly duty requirements is important for overall process stability of the distillation tower. A sudden change in melt tray assembly duty requirements may occur when abnormal operation occurs in the distillation process such as, but not limited to, when there is an upset in a reboiler within the distillation process, unexpected solid accumulation within the distillation tower and/or an upset in spray rate within the controlled freeze zone section from a spray assembly. When the sudden change occurs, the distillation tower must be modified to return to normal operation.

Conventional controlled freeze zone sections comprise a melt tray assembly with a melt tray heat exchange device having a single-phase heat transfer fluid. The melt tray heat exchange device is used to facilitate the warming of the solids, formed by a spray assembly in the controlled freeze zone section, in the melt tray assembly. However, disadvantages can result when using a single-phase heat transfer fluid. For example, the single-phase heat transfer fluid can cause a temperature differential between an inlet and an outlet of the melt tray assembly, which can make it difficult to hold a steady temperature within the melt tray assembly. Further, sudden changes in the melt tray assembly duty requirements can result in rapid changes in the necessary single-phase heat transfer fluid flow rate needed, thereby making it difficult for the desired temperature to be maintained in the melt tray assembly.

A need exists for improved technology that can better facilitate heat transfer within the melt tray assembly, can maintain steady-state conditions within the melt tray assembly, does not generate a substantial temperature differential within the melt tray assembly, and/or can effectively manage rapidly changing heat duty requirements within the controlled freeze zone section.

SUMMARY

The present disclosure provides a method and system for controlling a temperature within a melt tray assembly of a distillation tower.

A method of controlling a temperature within a melt tray assembly of a distillation tower may comprise maintaining a melt tray assembly, within a controlled freeze zone section of a distillation tower that forms a solid and a vapor from a stream that enters the distillation tower, that comprises a melt tray fluid and a melt tray heat exchanging device within the melt tray fluid; providing a phase changing fluid, to the melt tray heat exchanging device, that is configured to be a dual-phase heat transfer fluid; determining a melt tray fluid composition of the melt tray fluid; determining a melt tray fluid temperature of the melt tray fluid; determining if the melt tray fluid temperature is within an expected melt tray fluid temperature range for the melt tray fluid composition, wherein the expected temperature has an expected melt tray fluid temperature range upper limit and an expected melt tray fluid temperature range lower limit; and decreasing the melt tray fluid temperature if the melt tray fluid temperature is greater than the expected melt tray fluid temperature range upper limit, increasing the melt tray fluid temperature if the melt tray fluid temperature is less than the expected melt tray fluid temperature range lower limit, and maintaining the melt tray fluid temperature if the melt tray fluid temperature is within the expected melt tray fluid temperature range.

A method of producing hydrocarbons from a distillation tower may comprise maintaining a controlled freeze zone section of the distillation tower that forms a solid and a vapor from a stream that enters the distillation tower; maintaining a melt tray assembly, within the controlled freeze zone section, that comprises a melt tray fluid and a melt tray heat exchanging device within the melt tray fluid; providing a phase changing fluid, to the melt tray heat exchanging device, that is configured to be a dual-phase heat transfer fluid; determining a melt tray fluid composition of the melt tray fluid; determining a melt tray fluid temperature of the melt tray fluid; determining if the melt tray fluid temperature is within an expected melt tray fluid temperature range for the melt tray fluid composition, wherein the expected temperature has an expected melt tray fluid temperature range upper limit and an expected melt tray fluid temperature range lower limit; decreasing the melt tray fluid temperature if the melt tray fluid temperature is greater than the expected melt tray fluid temperature range upper limit, increasing the melt tray fluid temperature if the melt tray fluid temperature is less than the expected melt tray fluid temperature range lower limit, maintaining the melt tray fluid temperature if the melt tray fluid temperature is within the expected melt tray fluid temperature range; and producing hydrocarbon fluids from the distillation tower.

A system of controlling a temperature within a melt tray assembly of a distillation tower may comprise a distillation tower configured to process a stream, wherein the distillation tower comprises a controlled freeze zone section that separates the stream into solids and vapor, the controlled freeze zone section having a melt tray assembly including a melt tray fluid and a melt tray heat exchanging device within the melt tray fluid, wherein the melt tray heat exchanging device holds a phase changing fluid that is a dual-phase heat transfer fluid; a control system that determines if a melt tray fluid temperature of the melt tray fluid is within an expected melt tray fluid temperature range for a melt tray fluid composition of the melt tray fluid; and a melt tray temperature conditioning system that feeds the phase changing fluid to the melt tray heat exchanging device and is configured to modify a melt tray fluid temperature of the melt tray fluid if the melt tray fluid temperature is outside of the expected melt tray fluid temperature range.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
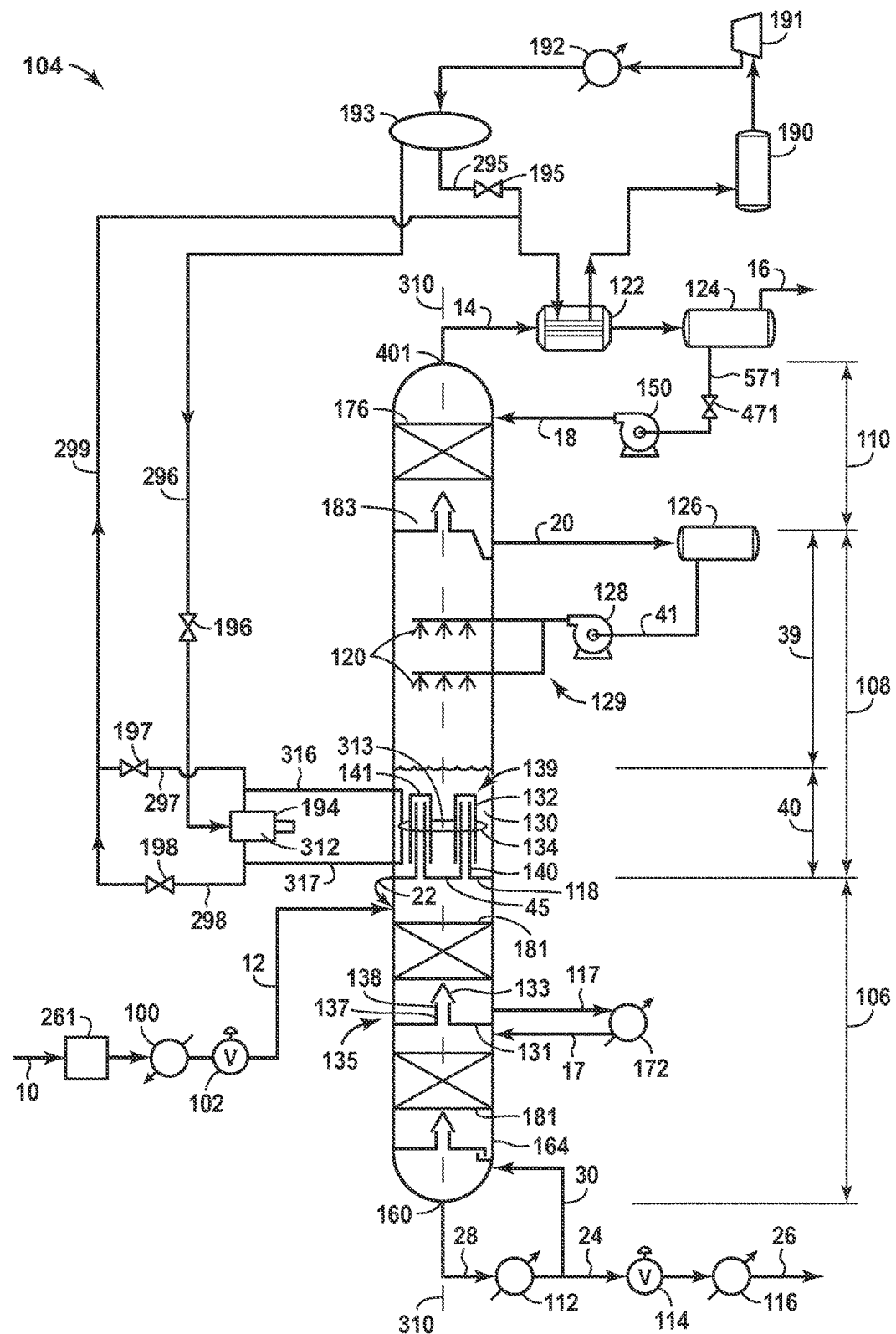
FIG. 1 is a schematic diagram of a distillation tower with a closed loop refrigeration system.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

As used herein, the term "closed loop refrigeration system" refers to a configuration where the overhead stream of a distillation process having a controlled freeze zone section is chilled and partially condensed with an external working fluid. The external working fluid does not physically mix with the overhead stream. The external working fluid cools the overhead stream. The overhead stream is the stream exiting a top of an upper section of the distillation tower. A closed loop melt tray temperature conditioning system in the distillation process is part of a closed loop refrigeration system.

As used herein, the term "open loop refrigeration system" refers to a configuration where the overhead stream is used to assist in providing cooling. A compressor may be used to assist in providing the cooling. An open loop melt tray temperature conditioning system in the distillation process is part of an open loop refrigeration system.

As used herein, the term "fluid" refers to gases, liquids, and combinations of gases and liquids.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at standard conditions (15° Celsius (C) and 1 atmosphere (atm) pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

The term "mass transfer device" refers to any object that receives fluids to be contacted, and passes those fluids to other objects, such as through gravitational flow.

As used herein, the term "subsurface" refers to geologic strata occurring below the earth's surface.

A "reservoir" or "subterranean reservoir" is a subsurface rock or sand formation from which a production fluid or resource can be harvested. The rock formation may include sand, granite, silica, carbonates, clays, and organic matter, such as bitumen, heavy oil (e.g., bitumen), gas, or coal, among others. Reservoirs can vary in thickness from less than one foot (0.3048 meter (m)) to hundreds of feet (hundreds of meters).

The term "steady-state condition" refers to when the key distillation process operating variables—pressure, temperature, composition and flows—have not fluctuated substantially for some period of time (e.g., hours). The period of time may range from greater than or equal to 15 minutes. The period of time may be any number within or bounded by the preceding range. When not at steady-state conditions, the distillation process may be at a transient state on its way to normal operation. Normal operation is when a melt tray fluid is at steady-state conditions. Abnormal operation is when the melt tray fluid is not at steady-state conditions.

The terms "substantial," "approximate" and "about" when used in reference to a quantity or amount of a material, or a specific characteristic thereof, refer to an amount that is sufficient to provide an effect that the material or characteristic was intended to provide. The exact degree of deviation allowable may in some cases depend on the specific context.

As referenced in this application, the terms "stream," "gas stream," "vapor stream," and "liquid stream" refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably.

A "temperature differential" is a change in temperature from an inlet to an outlet of the fluid that exchanges heat with the melt tray fluid.

A "temperature glide" is a refrigerant property. The temperature glide for a refrigerant is the change in temperature from a first droplet of condensation to the last bubble of vapor collapsing. For a pure refrigerant or an azeotrope, the temperature glide is zero, for a near-azeotrope the temperature glide is a small number that is close to zero and for a typical mixed-refrigerant the temperature glide is a large number. The small number may be any temperature that is less than 10° (degrees) F. (Fahrenheit). The small number may be any number within the previous range. The large number may be any temperature that is greater than or equal to 10° Fahrenheit. The large number may be any number within or bounded by the previous range. As it pertains to a distillation tower, the temperature glide is the temperature change between when the refrigerant enters and exits the distillation tower.

A "flow controlling device" refers to any suitable device that can control pressure and flow. A flow controlling device being "open" refers to the flow controlling device being anywhere from partially open to completely open.

The articles "the", "a" and "an" are not necessarily limited to mean only one, but rather are inclusive and open ended so as to include, optionally, multiple such elements.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The disclosure relates to a system and method for controlling a temperature within a melt tray assembly of a distillation tower and a method of producing hydrocarbons. FIGS. 1-8 of the disclosure display various aspects of the system and method.

The system and method may separate a feed stream, having hydrocarbons (e.g., methane) and contaminants, in a distillation tower. Referring to FIGS. 1-2 and 4-5, the system may comprise the distillation tower 104, 204 which may separate contaminant(s) from the methane.

The distillation tower 104, 204 may be separated into three functional sections: a lower section 106, a middle controlled freeze zone section 108 and an upper section 110. The distillation tower 104, 204 may incorporate three functional sections when the upper section 110 is needed and/or desired.

The distillation tower 104, 204 may incorporate only two functional sections when the upper section 110 is not needed and/or desired. When the distillation tower does not include an upper section 110, a portion of vapor leaving the middle controlled freeze zone section 108 may be condensed in a condenser/evaporator 122 and returned as a liquid stream via a spray assembly 129. Moreover, lines 18 and 20 may be eliminated, elements 124 and 126 may be one and the same, and elements 150 and 128 may be one and the same. The stream in line 14, now taking the vapors leaving the middle controlled freeze section 108, may direct these vapors to the condenser/evaporator 122.

The lower section 106 may interchangeably be referred to as a stripper section. The middle controlled freeze zone section 108 may interchangeably be referred to as a controlled freeze zone section. The upper section 110 may interchangeably be referred to as a rectifier section.

Figure 4:
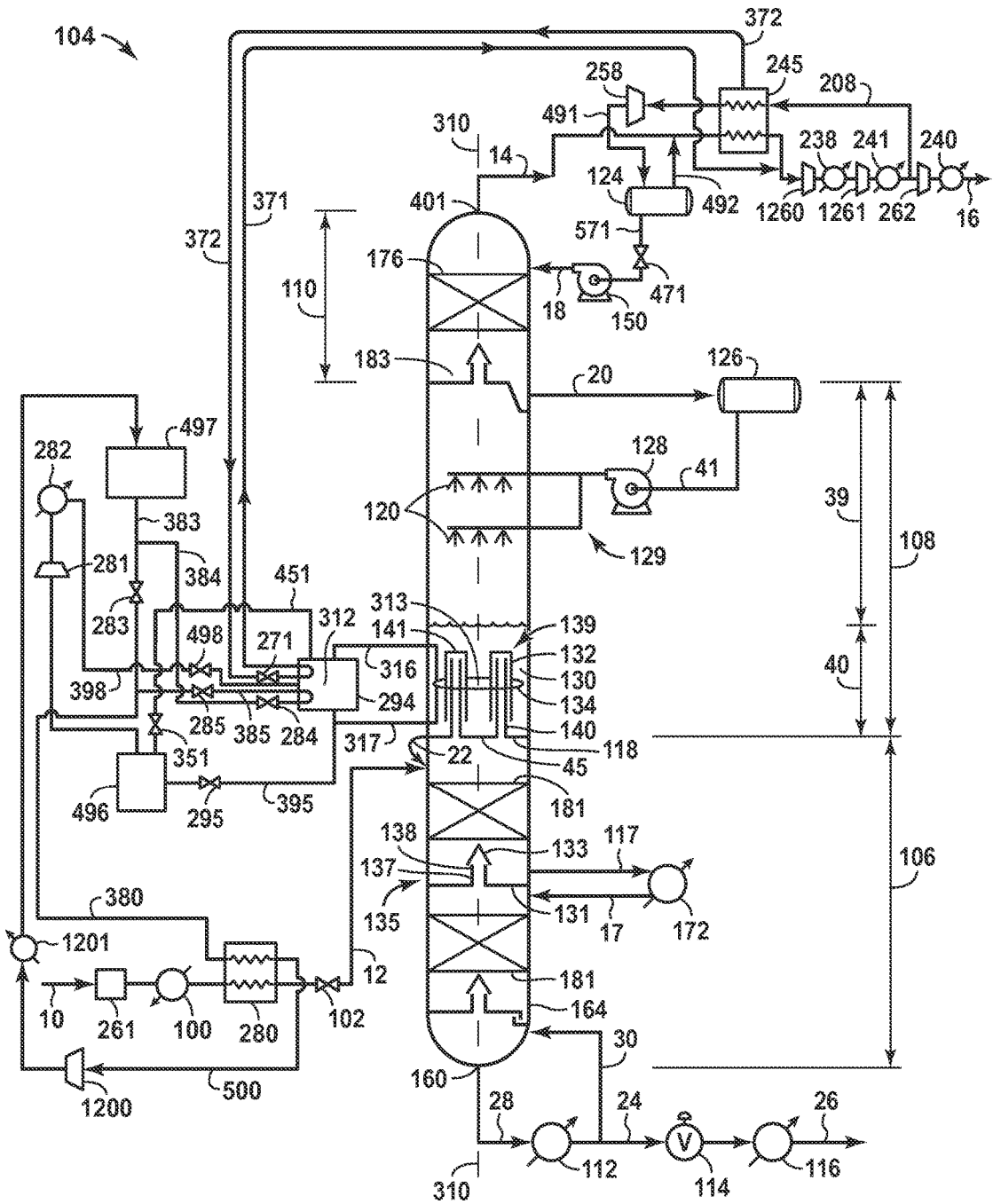
FIG. 4 is a schematic diagram of a distillation tower with an open loop refrigeration system.

The sections 106, 108, 110 of the distillation tower 104 may be housed within a single vessel (FIGS. 1 and 4). For example, the lower section 106, the middle controlled freeze zone section 108, and the upper section 110 may be housed within a single vessel 164.

Figure 2:
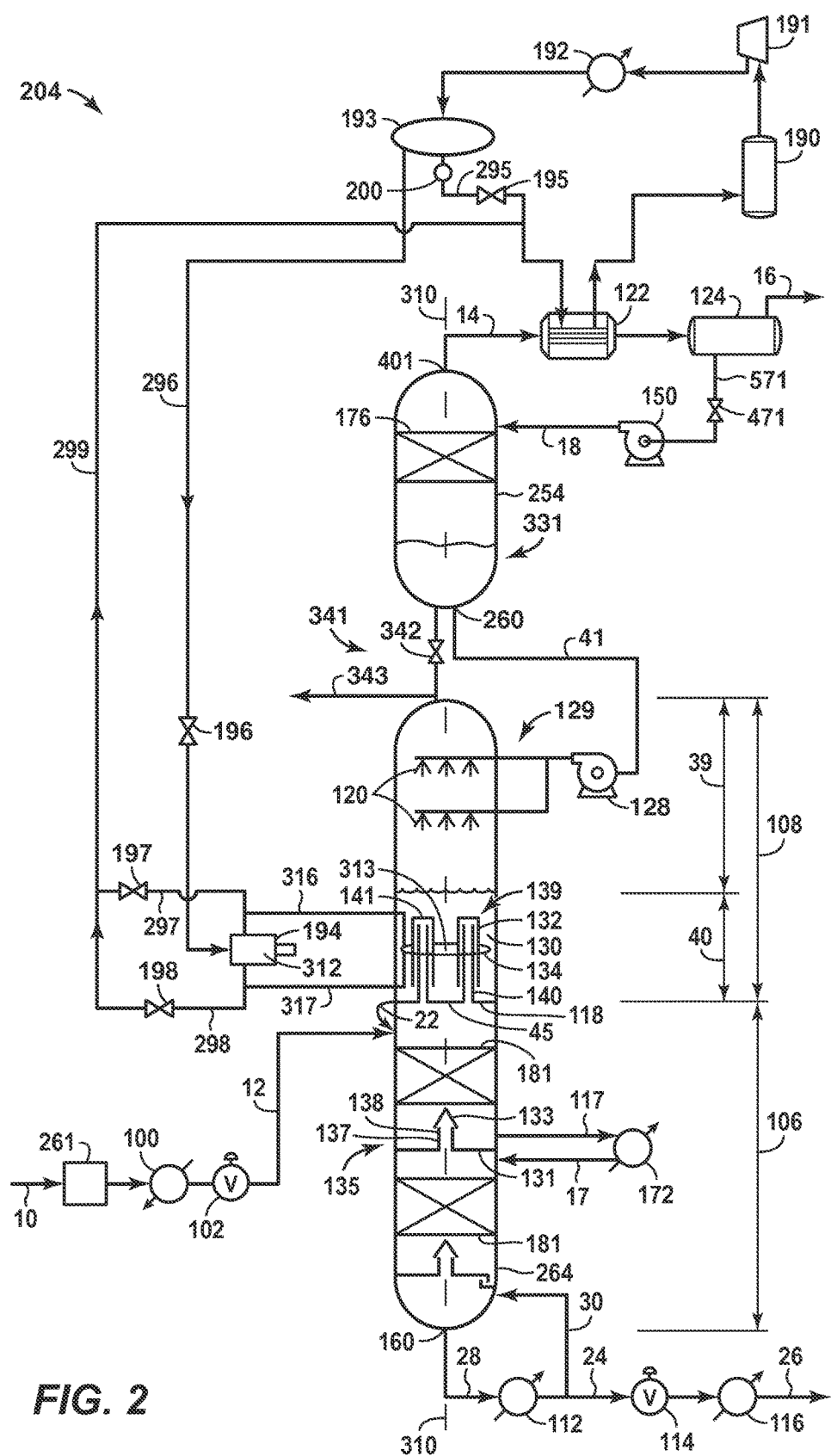
FIG. 2 is a schematic diagram of a distillation tower with a closed loop refrigeration system.
Figure 5:
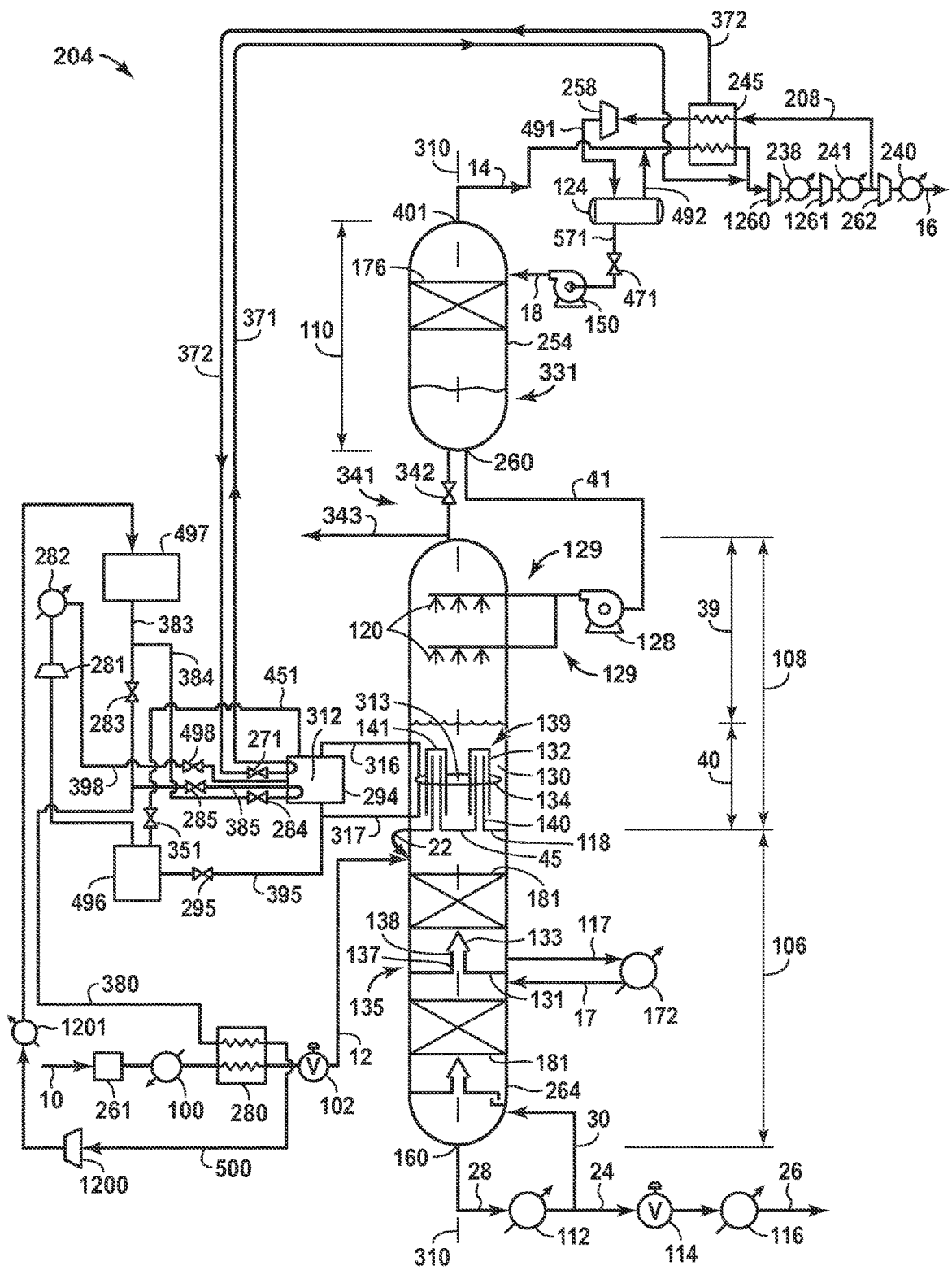
FIG. 5 is a schematic diagram of a distillation tower with an open loop refrigeration system.

The sections of the distillation tower 204 may be housed within a plurality of vessels 254, 264 to form a split-tower configuration (FIGS. 2 and 5). Each of the vessels may be separate from the other vessels. Piping 41, 341 and/or another suitable mechanism 342 may connect one vessel to another vessel. In this instance, the lower section 106, middle controlled freeze zone section 108 and upper section 110 may be housed within two or more vessels. For example, as shown in FIGS. 2 and 5, the upper section 110 may be housed within a single vessel 254 and the lower and middle controlled freeze zone sections 106, 108 may be housed within a single vessel 264. When this is the case, a liquid stream exiting the upper section 110 to the middle controlled freeze zone section 108, may exit the upper section 110 via a liquid outlet bottom 260. The liquid outlet bottom 260 is at the bottom of the upper section 110. Although not shown, each of the sections may be housed within its own separate vessel, or one or more section may be housed within separate vessels, or the upper and middle controlled freeze zone sections may be housed within a single vessel and the lower section may be housed within a single vessel, etc. When sections of the distillation tower are housed within vessels, the vessels may be side-by-side along a horizontal line and/or above each other along a vertical line. The split tower configuration may utilize a sump 331 of the upper section as a liquid receiver for the pump 128, therefore obviating the need for the holding vessel 126 in FIGS. 1 and 4. Further, in the split tower configuration, fluid may exit the middle controlled freeze zone section 108 through piping 343.

The system may include a heat exchanger 100 (FIGS. 1-2 and 4-5). The feed stream 10 may enter the heat exchanger 100 before entering the distillation tower 104, 204. The feed stream 10 may be cooled within the heat exchanger 100. The heat exchanger 100 helps drop the temperature of the feed stream 10 to a level suitable for introduction into the distillation tower 104, 204.

The system may include an expander device 102 (FIGS. 1-2 and 4-5). The feed stream 10 may enter the expander device 102 before entering the distillation tower 104, 204. The feed stream 10 may be expanded in the expander device 102 after exiting the heat exchanger 100. The expander device 102 can help drop the temperature and pressure of the feed stream 10 to a level suitable for introduction into the distillation tower 104, 204. The expander device 102 may be any suitable device, such as a valve. If the expander device 102 is a valve, the valve may be any suitable valve that may aid in cooling the feed stream 10 before it enters the distillation tower 104, 204. For example, the valve 102 may comprise a Joule-Thomson (J-T) valve.

The system may include a feed separator (not shown). The feed stream may enter the feed separator before entering the distillation tower 104, 204. The feed separator may separate a feed stream having liquid and vapor into a liquid stream and a vapor stream. Lines 12 may extend from the feed separator to the distillation tower 104, 204. One of the lines 12 may receive the vapor stream from the feed separator. Another one of the lines 12 may receive the liquid stream from the feed separator. Each of the lines 12 may extend to the same and/or different sections (i.e. middle controlled freeze zone, and lower sections) of the distillation tower 104, 204. The expander device 102 may or may not be downstream of the feed separator. The expander device 102 may comprise a plurality of expander devices 102 such that each line 12 has an expander device 102. If the system includes the feed separator, the line 12 may comprise a plurality of lines 12. Each line may be the same line as one of the lines that extends from the feed separator to a specific portion of the distillation tower 104, 204.

The system may include a dehydration unit 261 (FIGS. 1-2 and 4-5). The feed stream 10 may enter the dehydration unit 261 before entering the distillation tower 104, 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator, or distillation tower 104, 204. The water can present a problem by forming a separate water phase (i.e., ice and/or hydrate) that plugs lines, equipment or otherwise negatively affects the distillation process. The dehydration unit 261 dehydrates the feed stream to a dew point sufficiently low to ensure a separate water phase will not form at any point downstream during the rest of the process. The dehydration unit may be any suitable dehydration mechanism, such as a molecular sieve or a glycol dehydration unit.

The system may include a filtering unit (not shown). The feed stream 10 may enter the filtering unit before entering the distillation tower 104, 204. The filtering unit may remove undesirable solid and/or liquid phase contaminants from the feed stream before the feed stream enters the distillation tower 104, 204. Depending on what contaminants are to be removed, the filtering unit may be before or after the dehydration unit 261 and/or before or after the heat exchanger 100.

The system may include line 12 (FIGS. 1-2 and 4-5). The line may interchangeably be referred to as an inlet channel 12. The feed stream 10 may be introduced into the distillation tower 104, 204 through the line 12. The line 12 may extend to the lower section 106 or the middle controlled freeze zone section 108 of the distillation tower 104, 204. For example, the line 12 may extend to the lower section 106 such that the feed stream 10 may enter the lower section 106 of the distillation tower 104, 204. The line 12 may directly or indirectly extend to the lower section 106 or the middle controlled freeze zone section 108. The line 12 may extend to an outer surface of the distillation tower 104, 204 before entering the distillation tower 104, 204.

The lower section 106 is constructed and arranged to separate the feed stream 10 into a liquid stream and a vapor stream. The lower section 106 separates the feed stream at a temperature and pressure at which no solids form. The liquid stream may comprise a greater quantity of contaminants than methane. The vapor stream may comprise a greater quantity of methane than contaminants. In any case, the vapor stream is lighter than the liquid stream. As a result, the vapor stream rises from the lower section 106 and the liquid stream falls to the bottom of the lower section 106.

The lower section 106 may include and/or connect to equipment that separates the stream. The equipment may comprise any suitable equipment for separating methane from contaminants Generally speaking, the suitable equipment comprises some type of mass transfer device. For example, the suitable equipment may comprise one or more packed sections 181, or one or more distillation trays with perforations, downcomers, and weirs (FIGS. 1-2 and 4-5).

The suitable equipment may include components that apply heat to the stream to form the vapor stream and the liquid stream. For example, the equipment may comprise a first reboiler 112 that applies heat to the stream. The first reboiler 112 may be located outside of the distillation tower 104, 204. The equipment may also comprise a second reboiler 172 that applies heat to the stream. The second reboiler 172 may be located outside of the distillation tower 104, 204. Line 117 may lead from the distillation tower 104, 204 to the second reboiler 172. Line 17 may lead from the second reboiler 172 to the distillation tower 104, 204. Additional reboilers, set up similarly to the second reboiler described above, may also be used.

The first reboiler 112 may apply heat to the liquid stream that exits the lower section 106 via a liquid outlet 160 of the lower section 106. The liquid stream may travel from the liquid outlet 160 through line 28 to reach the first reboiler 112 (FIGS. 1-2 and 4-5). The amount of heat applied to the liquid stream by the first reboiler 112 can be increased to separate more methane from contaminants. The more heat applied by the reboiler 112 to the stream, the more methane separated from the liquid contaminants, though more contaminants will also be vaporized.

The first reboiler 112 may also apply heat to the stream within the distillation tower 104, 204. Specifically, the heat applied by the first reboiler 112 warms up the lower section 106. This heat travels up the lower section 106 and supplies heat to warm solids entering a melt tray assembly 139 (FIGS. 1-2 and 4-5) of the middle controlled freeze zone section 108 so that the solids form a liquid slurry.

The second reboiler 172 applies heat to the stream within the lower section 106. This heat is applied closer to the middle controlled freeze zone section 108 than the heat applied by the first reboiler 112. As a result, the heat applied by the second reboiler 172 reaches the middle controlled freeze zone section 108 faster than the heat applied by the first reboiler 112. The second reboiler 172 may be configured to help with energy integration.

The suitable equipment may include one or more chimney assemblies 135 (FIGS. 1-2 and 4-5). While falling to the bottom of the lower section 106, the liquid stream may encounter one or more of the chimney assemblies 135.

Each chimney assembly 135 includes a chimney tray 131 that collects the liquid stream within the lower section 106. The liquid stream that collects in the chimney tray 131 may be fed to the second reboiler 172. After the liquid stream is heated in the second reboiler 172, the stream may return to the middle controlled freeze zone section 108 to supply heat to the middle controlled freeze zone section 108 and/or the melt tray assembly 139. Unvaporized stream exiting the second reboiler 172 may be fed back to the distillation tower 104, 204 below the chimney tray 131. Vapor stream exiting the second reboiler 172 may be routed under or above the chimney tray 131 when the vapor stream enters the distillation tower 104, 204.

The chimney tray 131 may include one or more chimneys 137. The chimney 137 serves as a channel that the vapor stream in the lower section 106 traverses. The vapor stream travels through an opening in the chimney tray 131 at the bottom of the chimney 137 to the top of the chimney 137. The opening in the chimney tray 131 is closer to the bottom of the lower section 106 than it is to the bottom of the middle controlled freeze zone section 108. The top of the chimney 137 is closer to the bottom of the middle controlled freeze zone section 108 than it is to the bottom of the lower section 106.

Each chimney 137 has attached to it a chimney cap 133. The chimney cap 133 covers a chimney top opening 138 of the chimney 137. The chimney cap 133 prevents a liquid stream from entering the chimney 137. The vapor stream exits the chimney assembly 135 via the chimney top opening 138.

After falling to the bottom of the lower section 106, the liquid stream may exit the distillation tower 104, 204 through the liquid outlet 160. The liquid outlet 160 is within the lower section 106 (FIGS. 1-2 and 4-5). The liquid outlet 160 may be located at the bottom of the lower section 106.

After exiting through the liquid outlet 160, the feed stream may travel via line 28 to the first reboiler 112. The feed stream may be heated by the first reboiler 112 and vapor may then re-enter the lower section 106 through line 30. Unvaporized liquid may continue out of the distillation tower 104, 204 via line 24.

The system may include an expander device 114 (FIGS. 1-2 and 4-5). After entering line 24, the liquid stream may be expanded in the expander device 114. The expander device 114 may be any suitable device, such as a valve. The valve 114 be any suitable valve, such as a J-T valve.

The system may include a heat exchanger 116 (FIGS. 1-2 and 4-5). The liquid stream heated by the first reboiler 112 may be cooled or heated by the heat exchanger 116. After exiting the expander device 114, the liquid stream may enter the heat exchanger 116. The heat exchanger 116 may be a direct heat exchanger or an indirect heat exchanger. The heat exchanger 116 may comprise any suitable heat exchanger. The liquid stream may then exit the heat exchanger through line 26.

The vapor stream in the lower section 106 rises from the lower section 106 to the middle controlled freeze zone section 108. The middle controlled freeze zone section 108 may be constructed and arranged to separate the feed stream 10 introduced into the middle controlled freeze zone section into the solids and the vapor stream (not shown). The middle controlled freeze zone section 108 may receive a liquid stream to form solids, liquids and/or a vapor stream in the middle controlled freeze zone section 108. The solids, liquids and/or vapor stream are formed in the middle controlled freeze zone section 108 when the liquid stream is injected into the middle controlled freeze zone section 108 at a temperature and pressure at which the solids, liquids and/or vapor stream form from the liquid stream sprayed into the middle controlled freeze zone section 108. The solids may comprise carbon dioxide. The carbon dioxide solids may trap more contaminants than they trap methane. The vapor stream may comprise more methane than contaminants. The vapor stream may rise in the middle controlled freeze zone section 108.

The vapor stream that rises in the middle controlled freeze zone section 108 and does not form solids or otherwise fall to the bottom of the middle controlled freeze zone section 108, rises to the upper section 110. The upper section 110 operates at a temperature and pressure and contaminant concentration at which no solids form at normal operation. At abnormal operation, the heat exchanging device 134 may assist the upper section 110 in operating at a temperature and a pressure and contaminant concentration at which no solids form. The upper section 110 is constructed and arranged to cool the vapor stream to separate the methane from the contaminants. Reflux in the upper section 110 cools the vapor stream and absorbs contaminants. The reflux is introduced into the upper section 110 via line 18. Line 18 may extend to the upper section 110. Line 18 may extend from an outer surface of the distillation tower 104, 204.

After contacting the reflux in the upper section 110, the stream may form a vapor stream and a liquid stream. The vapor stream mainly comprises methane. The liquid stream comprises relatively more contaminants. The vapor stream rises in the upper section 110 and the liquid falls to a bottom of the upper section 110.

To facilitate separation of the methane from the contaminants when the stream contacts the reflux, the upper section 110 may include one or more mass transfer devices 176. Each mass transfer device 176 helps separate the methane from the contaminants. Each mass transfer device 176 may comprise any suitable separation device, such as a tray with perforations, or a section of random or structured packing 176 to facilitate contact of the vapor and liquid phases within the stream.

The system may include a reflux accumulator 124 (FIGS. 1-2 and 4-5). The reflux accumulator 124 may be any suitable reflux accumulator that can separate a stream into a liquid stream and a vapor stream, such as a reflux drum. The reflux accumulator may serve as a holding unit for the cooled stream entering the reflux accumulator 124. The reflux accumulator 124 may hold liquid and/or vapor. The liquid within the reflux accumulator 124 may be referred to as reflux. The liquid reflux may comprise methane. The liquid reflux may also comprise contaminants. The contaminants may comprise at least one of carbon dioxide and hydrogen sulfide.

The liquid reflux may exit the reflux accumulator 124 via line 571 and be fed to the upper section 110 via line 18 (FIGS. 1-2 and 4-5). The liquid reflux may travel to the upper section 110 via any suitable mechanism, such as a reflux pump 150 (FIGS. 1-2 and 4-5) or gravity. Before the liquid of the reflux is fed to the upper section 110, the liquid may pass through flow controlling device 471. Flow controlling device 471 may help to control the amount of liquid that travels from the reflux accumulator 124 to the upper section 110.

As shown in FIGS. 4-5, a stream may be fed to the reflux accumulator 124 via line 491. The stream fed to the reflux accumulator 124 via line 491 may be a two phase stream. For example, the stream may comprise a vapor and a liquid. The stream may be fed to the reflux accumulator 124 after exiting a heat exchanging device 245. After exiting the heat exchanging device 245, the stream may enter a pressure controlling/reducing device 258 so as to decrease the pressure and temperature of the stream before being sent to the reflux accumulator 124. The pressure controlling/reducing device 258 may be any suitable device such as but not limited to a valve or an expander. Once in the reflux accumulator 124, any vapor within the stream may exit the reflux accumulator 124 via line 492. The vapor 492 exiting the reflux accumulator 124 may be fed to the heat exchanging device 245. As shown in FIGS. 4 and 5, stream 492 may be mixed with stream 14 or may be fed into heat exchanger 245 as a separate stream before being fed into the downstream pressure increasing device 1260.

The middle controlled freeze zone section 108 includes a lower section 40 and an upper section 39 (FIGS. 1-2 and 4-5). The lower section 40 is below the upper section 39. The lower section 40 directly abuts the upper section 39. The lower section 40 is primarily but may not exclusively be a heating section of the middle controlled freeze zone section 108. The upper section 39 is primarily a cooling section of the middle controlled freeze zone section 108.

Figure 8:
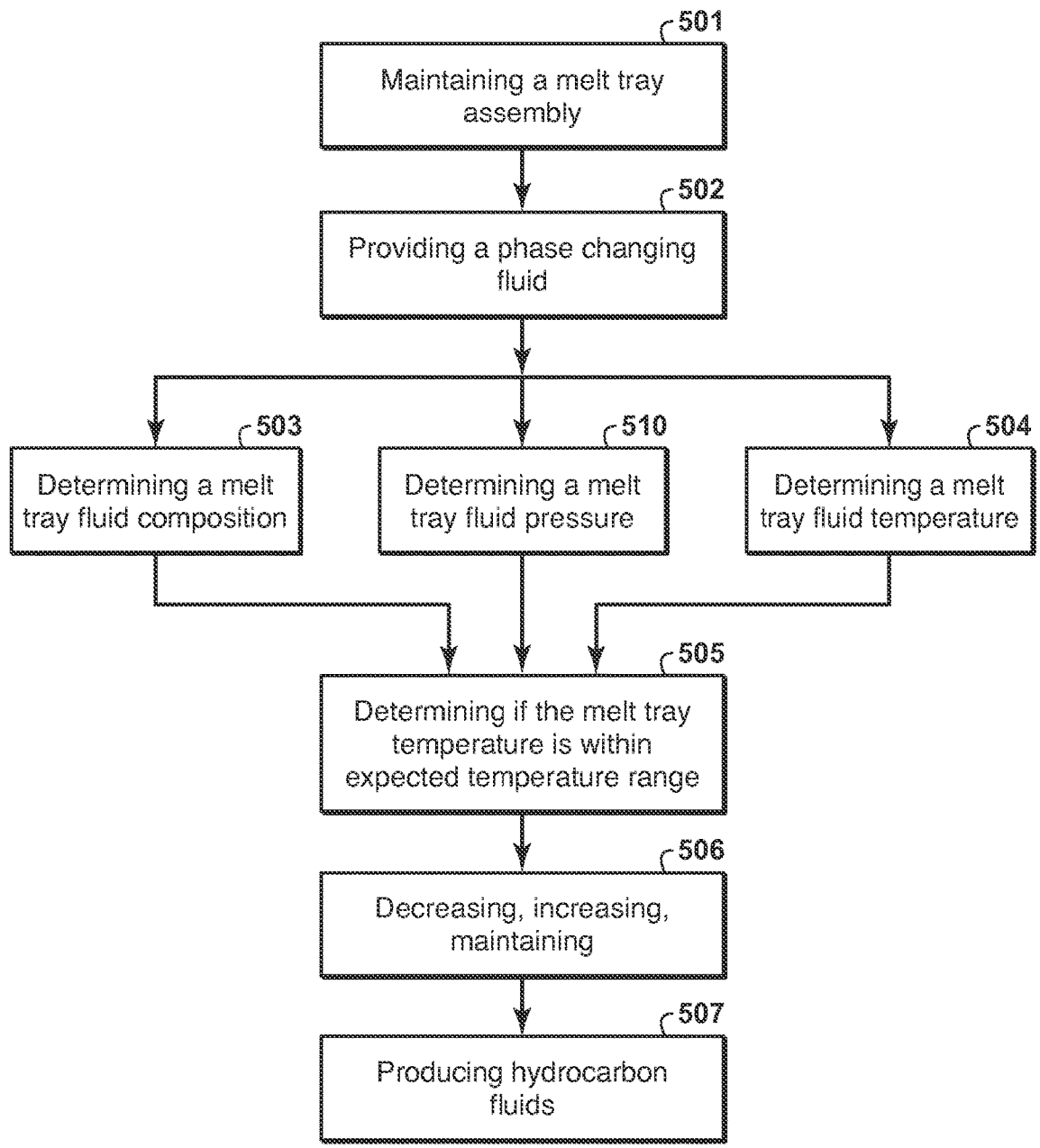
FIG. 8 is a schematic diagram of a method according to the present disclosure.

The middle controlled freeze zone section 108 may comprise a melt tray assembly 139 that is maintained in the middle controlled freeze zone section 108, 501 (FIG. 8). The melt tray assembly 139 is within the lower section 40 of the middle controlled freeze zone section 108. The melt tray assembly 139 is not within the upper section 39 of the middle controlled freeze zone section 108.

The melt tray assembly 139 is constructed and arranged to melt solids formed in the middle controlled freeze zone section 108. When the vapor stream rises from the lower section 106 to the middle controlled freeze zone section 108, the vapor stream immediately encounters the melt tray assembly 139 and is cooled.

The melt tray assembly 139 may comprise a melt tray 118 and a melt tray heat exchanging device 134. The melt tray assembly may also comprise at least one of a melt tray fluid 130 and a bubble cap 132.

The melt tray 118 may collect a liquid slurry. The melt tray 118 divides at least a portion of the middle controlled freeze zone section 108 from the lower section 106. The melt tray 118 is at the bottom 40 of the middle controlled freeze zone section 108 (FIGS. 1-2 and 4-5).

The melt tray heat exchanging device 134 may heat up the melt tray fluid 130 to facilitate melting of the solids into the liquid slurry. The melt tray heat exchanging device 134 may cool down the melt tray fluid 130 to reduce a contaminant concentration entering the upper section 110. The melt tray heat exchanging device(s) 134 may be located anywhere within the melt tray assembly 139. For example, as shown in FIGS. 1-2 and 4-5, a melt tray heat exchanging device 134 may be located around the bubble caps 132.

The melt tray heat exchanging device 134 holds a phase changing fluid. The phase changing fluid is a dual-phase heat transfer fluid. The dual-phase heat transfer fluid may be any fluid having a characteristic that comprises at least one of a substantially low reactivity, non-toxicity, a substantially low viscosity, a substantially low de-sublimation temperature or melting point, a substantially low flammability, a substantially low greenhouse warming potential (GHWP), a substantially low odor, a substantially high latent heat of vaporization and a substantially low temperature glide. Substantially low reactivity may mean that the phase changing fluid does not substantially react with air or does not react with air. A substantially low viscosity may be equal to less than a few centipoise at the lowest operating temperature. A substantially low sublimation temperature may be equal to a substantially low sublimation temperature or melting point, such that dual-phase heat transfer fluid does not freeze during abnormal operation or normal operation. A substantially low flammability may be equal to a flammability rating of no more than 0-4 on the Hazardous Materials Identification System point scale. A substantially low GHWP may be equal to being less than 100 times that of carbon dioxide. The GHWP of carbon dioxide is 1. A substantially low odor may refer to an odor that is tolerable at a few percent concentration. Examples of non-substantially low odor include, but are not limited to, ammonia and sulfur dioxide. A substantially high latent heat of vaporization may be equal to at least 100 BTU/lb. (British thermal unit per pound).

The dual-phase heat transfer fluid may have a critical temperature of greater than −50° F., a normal boiling point of less than −100° F., and a melting point of less than the boiling point. The aforementioned ranges include any number within or bounded by the preceding examples, respectively. Examples of suitable dual-phase heat transfer fluids comprise, but are not limited to, one of a single-component fluid and an azeotropic blend. Examples of single component fluids include, but are not limited to, propane, carbon dioxide, ammonia, a single halogenated hydrocarbon, ethane, ethylene and trifluoromethane. Examples of azeotropic blends include, but are not limited to, an azeotrope of carbon dioxide and ethane and a combination of components with a temperature glide that allows the intended purpose of the present disclosure to work. With respect to the combination of components with the temperature glide, the temperature glide may be less than or equal to 10° C. or 18° F. The temperature glide may be any number within and/or bounded by the preceding temperature range. The ethane may be used as an azeotrope with carbon dioxide.

The melt tray heat exchanging device 134 may receive the phase changing fluid from a working fluid reservoir 194, 294. The working fluid reservoir 194, 294 holds the phase changing fluid. When the melt tray heat exchanging device 134 receives the phase changing fluid from the working fluid reservoir 194, 294, the phase changing fluid may comprise a portion of the working fluid. The working fluid reservoir 194, 294 provides the phase changing fluid to the melt tray heat exchanging device 134, 502 (FIG. 8). The working fluid reservoir 194, 294 provides the phase changing fluid during normal operation and during abnormal operation.

At normal operation, the melt tray heat exchanging device 134 receives working fluid vapor from the working fluid reservoir 194, 294 via line 316 (FIGS. 1-6). The working fluid vapor condenses in the melt tray heat exchanging device 134 to form working fluid liquid, thereby warming the melt tray fluid 130. The temperature of the working fluid vapor as it condenses may remain constant and the pressure of the working fluid vapor may be held steady. Condensation may occur at a constant temperature if the pressure of the working fluid is held constant if the fluid is an azeotrope or a pure component. For a pure component (e.g., propane), vapor may condense at about or at −44° F. as long as the pressure is held constant at about or at 1 atmosphere (atm.).

There may be enough inventory in the distillation system that the pressure may remain constant. The working fluid liquid returns to the working fluid reservoir 194 via line 317 (FIGS. 1-6).

The system may include a melt tray temperature conditioning system 330, 430. The melt tray temperature conditioning system 330, 430 may be configured to modify the melt tray fluid temperature of the melt tray fluid 130. The melt tray temperature conditioning system 330, 430 may be configured to modify the melt tray fluid temperature of the melt tray fluid 130 if the melt tray fluid temperature is outside of an expected melt tray fluid temperature range. The melt tray temperature conditioning system 330, 430 may feed the phase changing fluid to the melt tray heat exchanging device 134 to modify the melt tray fluid temperature of the melt tray fluid 130. The melt tray temperature conditioning system 330, 430 may comprise one of a closed loop melt tray temperature conditioning system 330 (FIGS. 1-3) and an open loop melt tray temperature conditioning system 430 (FIGS. 4-6).

The expected melt tray fluid temperature range is a range of temperatures from an expected melt tray fluid temperature that are indicative of normal operation. The expected melt tray fluid temperature range has an expected melt tray fluid temperature range upper limit and an expected melt tray fluid temperature range lower limit. The expected melt tray fluid temperature range may be any suitable temperature range. For example, the expected melt tray fluid temperature range may be between −65° F. and −100° F. The aforementioned range may include any number bounded or included within the range. The expected melt tray fluid temperature is the temperature of the melt tray fluid 130 at normal operation.

If the melt tray fluid temperature of the melt tray fluid 130 is greater than the expected melt tray fluid temperature range upper limit, the distillation tower 104, 204 is at an abnormal operation and the melt tray fluid 130 is too warm. If the melt tray fluid temperature of the melt tray fluid 130 is less than the expected melt tray fluid temperature range lower limit, the distillation tower 104, 204 is at an abnormal operation and the melt tray fluid 130 is too cold.

The closed loop melt tray temperature conditioning system 330 (FIGS. 1-3) may comprise a working fluid reservoir 194. The working fluid reservoir 194 holds the working fluid that is fed to the melt tray heat exchanging device 134. Working fluid is fed to the melt tray heat exchanging device 134 via lines 316, 317. The working fluid reservoir 194 may receive fluid from the melt tray heat exchanging device 134 via lines 316, 317. The melt tray heat exchanging device 134 may receive fluid from the working fluid reservoir 194.

The working fluid in the working fluid reservoir 194 may comprise any suitable working fluid. For example, the working fluid may comprise one of propane, carbon dioxide, ethane, ammonia, ethylene, an azeotrope of carbon dioxide and ethane, a single halogenated hydrocarbon and a combination of components with a temperature glide that allows the intended purpose of the present disclosure to work. With respect to the combination of components with the temperature glide, the temperature glide may be less than or equal to 10° C. or 18° F. The temperature glide may be any number within and/or bounded by the preceding temperature range. The ethane may be used as an azeotrope with carbon dioxide.

The closed loop melt tray temperature conditioning system 330 may include the overhead refrigeration refrigerant accumulator 193. The overhead refrigeration refrigerant accumulator 193 holds refrigerant. The refrigerant comprises working fluid. In the closed loop melt tray temperature conditioning system 330, the refrigerant is the working fluid and therefore the refrigerant may interchangeably be referred to as working fluid.

The overhead refrigeration refrigerant accumulator is configured to selectively feed the refrigerant to the working fluid reservoir 194. The overhead refrigeration refrigerant accumulator 193 connects to the working fluid reservoir 194 via line 296. The overhead refrigeration refrigerant accumulator 193 is able to selectively feed the refrigerant to the working fluid reservoir 194 because the line 296 may include a flow controlling device 196. The flow controlling device 196 may be any suitable device, such as but not limited to a valve. When the flow controlling device 196 is open, the overhead refrigeration refrigerant accumulator 193 feeds refrigerant to the working fluid reservoir 194. When the flow controlling device 196 is closed, the working fluid reservoir 194 does not receive refrigerant from the overhead refrigeration refrigerant accumulator 193 because the flow controlling device 196 prevents the overhead refrigeration refrigerant accumulator 193 from feeding refrigerant to the working fluid reservoir 194.

The overhead refrigeration refrigerant accumulator 193 may connect to a condenser/evaporator 122. Refrigerant from the overhead refrigeration refrigerant accumulator 193 may be fed to the condenser/evaporator 122 after undergoing a pressure drop to cool the stream exiting the rectifier section 110, thereby forming a cooled stream. The condenser/evaporator 122 at least partially condenses the stream exiting the rectifier section 110. The refrigerant fed to the condenser/evaporator 122 may change from a liquid to a vapor as it cools the stream exiting the rectifier section 110. The stream fed from the rectifier section 110 to the condenser/evaporator 122 may be fed to the condenser/evaporator 122 via line 14. Line 14 may emanate from an upper part of the upper section 110. The line 14 may extend from an outer surface of the upper section 110, such as through exit 401. The stream exiting the rectifier section 110 and entering the line 14 is a vapor stream.

The overhead refrigeration refrigerant accumulator 193 may be configured to selectively feed working fluid to the condenser/evaporator 122 via line 295. The overhead refrigeration refrigerant accumulator 193 is able to selectively feed refrigerant to the condenser/evaporator 122 via line 295 because the line 295 may include a flow controlling device 195. The flow controlling device 195 may be any suitable device that can modify pressure and flow, such as but not limited to a valve. When the flow controlling device 195 is open, the overhead refrigeration refrigerant accumulator 193 feeds refrigerant to the condenser/evaporator 122; when the flow controlling device 195 is closed, the overhead refrigeration refrigerant accumulator 193 does not feed refrigerant to the condenser/evaporator 122. When the refrigerant is fed from the overhead refrigeration refrigerant accumulator 193 to the condenser/evaporator 122, the flow controlling device 195 facilitates a pressure drop within the refrigerant, thereby causing a decrease in the pressure and temperature of the refrigerant.

The condenser/evaporator 122 may receive working fluid directly from the working fluid reservoir 194 via lines 297, 298, 299. The condenser/evaporator 122 may be configured to selectively receive working fluid from the working fluid reservoir 194. The condenser/evaporator 122 may be so configured because the lines 297, 298 may include flow controlling device 197 and flow controlling device 198, respectively. When flow controlling device 197 is open, the condenser/evaporator 122 may receive vapor from the working fluid reservoir 194 via lines 297, 299. When flow controlling device 198 is open, the condenser/evaporator 122 may receive liquid from the working fluid reservoir 194 via lines 298, 299. The working fluid fed to the condenser/evaporator 122 may mix with the refrigerant that is fed to the condenser/evaporator 122 to exchange heat with the stream exiting the upper section 110, thereby cooling the stream so the stream exits the condenser/evaporator 122 as a cooled stream.

Multiple streams may exit the condenser/evaporator 122. One of these streams may enter the reflux accumulator 124. Once separated, the vapor stream may exit the reflux accumulator 124 as sales product via line 16 for subsequent sale to a pipeline and/or condensation to be liquefied natural gas. Once separated, the liquid stream may return to the upper section 110 as described above.

The liquid stream that falls to the bottom of the upper section 110 may collect at the bottom of the upper section 110. The liquid may collect on tray 183 (FIG. 1) or at the bottommost portion of the upper section 110 (FIG. 2).

The liquid may exit the distillation tower 104, 204 through line 20 (FIG. 1) or outlet 260 (FIG. 2). The line 20 may emanate from the upper section 110. The line 20 may emanate from a bottom end of the upper section 110. The line 20 may extend from an outer surface of the upper section 110. The line 20 and/or outlet 260 may connect to a line 41. The line 41 leads to the spray assembly 129 in the middle controlled freeze zone section 108. The line 41 may extend to an outer surface of the middle controlled freeze zone section 108.

The line 20 and/or outlet 260 may directly or indirectly (FIGS. 1-2) connect to the line 41. When the line 20 and/or outlet 260 directly connect to the line 41, the liquid spray may be pumped to the spray nozzle(s) 120 via any suitable mechanism, such as the spray pump 128 or gravity. When the line 20 and/or outlet 260 indirectly connect to the line 41, the lines 20, 41 and/or outlet 260 and line 41 may directly connect to a holding vessel 126 (FIG. 1).

The holding vessel 126 may house at least some of the liquid spray before it is sprayed by the spray nozzle(s). The liquid spray may be pumped from the holding vessel 126 to the spray nozzle(s) 120 via any suitable mechanism, such as the spray pump 128 (FIG. 1) or gravity. The holding vessel 126 may be needed when there is not a sufficient amount of liquid stream at the bottom of the upper section 110 to feed the spray nozzles 120. A multiple vessel distillation tower 204 (FIG. 2) may or may not include a holding vessel 126.

The refrigerant that exchanges heat with the stream cooled in the condenser/evaporator 122 may exit the condenser/evaporator 122 and enter a separator 190. The separator 190 may separate the refrigerant and/or working fluid exiting the condenser/evaporator 122 into a vapor stream and a liquid stream. The refrigerant and/or working fluid exiting the condenser/evaporator 122 may substantially be a vapor stream, but to ensure that only vapor enters the compressor 191, the separator 190 may be used. The separator 190 may be any suitable separator, such as but not limited to a vertical, horizontal or inclined separator. The separator may include, but is not limited to, knock out drums, demister pads or cyclonic devices.

The separator 190 may connect to a compressor 191. The compressor 191 may receive the vapor stream from the separator 190. The compressor 191 may increase the pressure and temperature of the vapor stream.

The vapor stream exiting the compressor 191 may enter a heat exchanger 192. The heat exchanger 192 may modify the temperature of the vapor before it is fed to the overhead refrigeration refrigerant accumulator 193. The heat exchanger 192 may modify the temperature of the vapor by cooling and condensing the vapor before it is fed to the overhead refrigeration refrigerant accumulator 193.

Figure 3A:
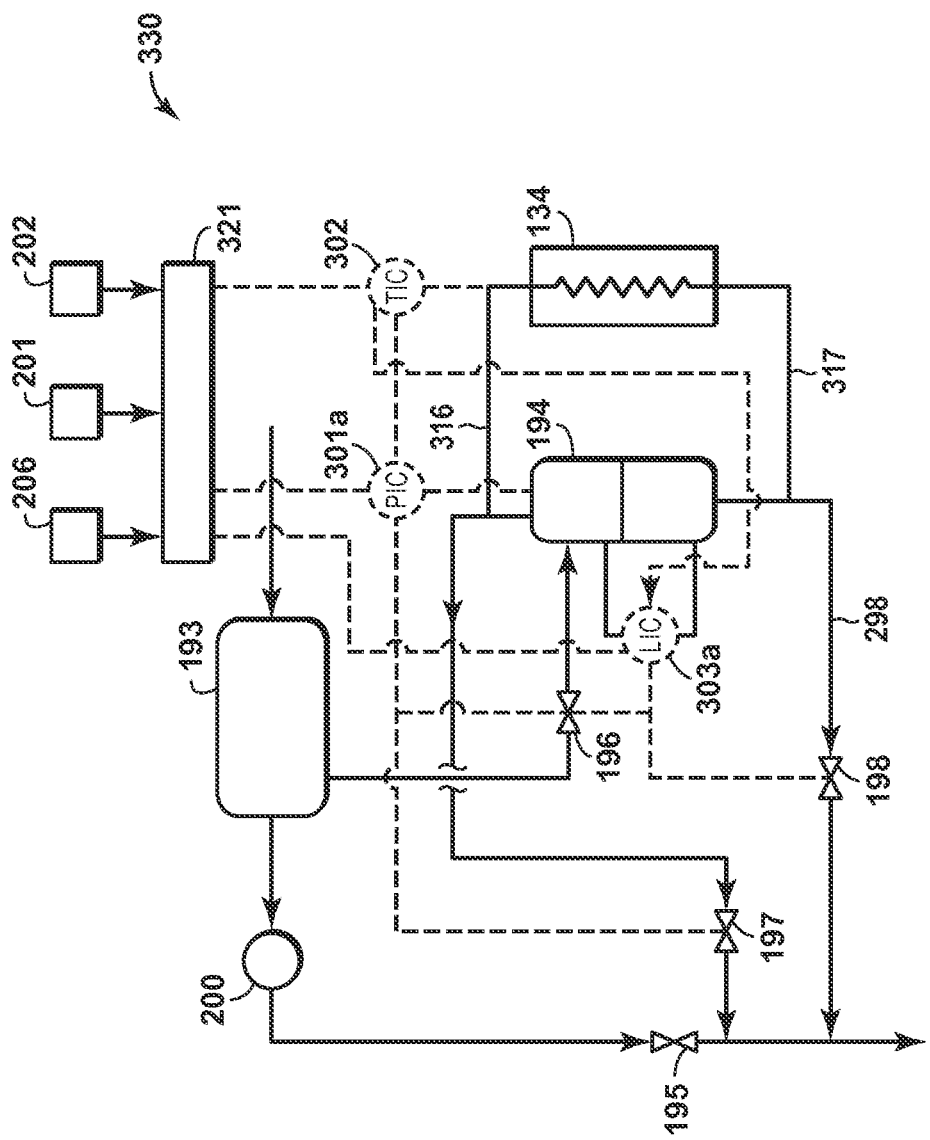
FIG. 3A is a schematic diagram of a portion of FIG. 2.
Figure 3B:
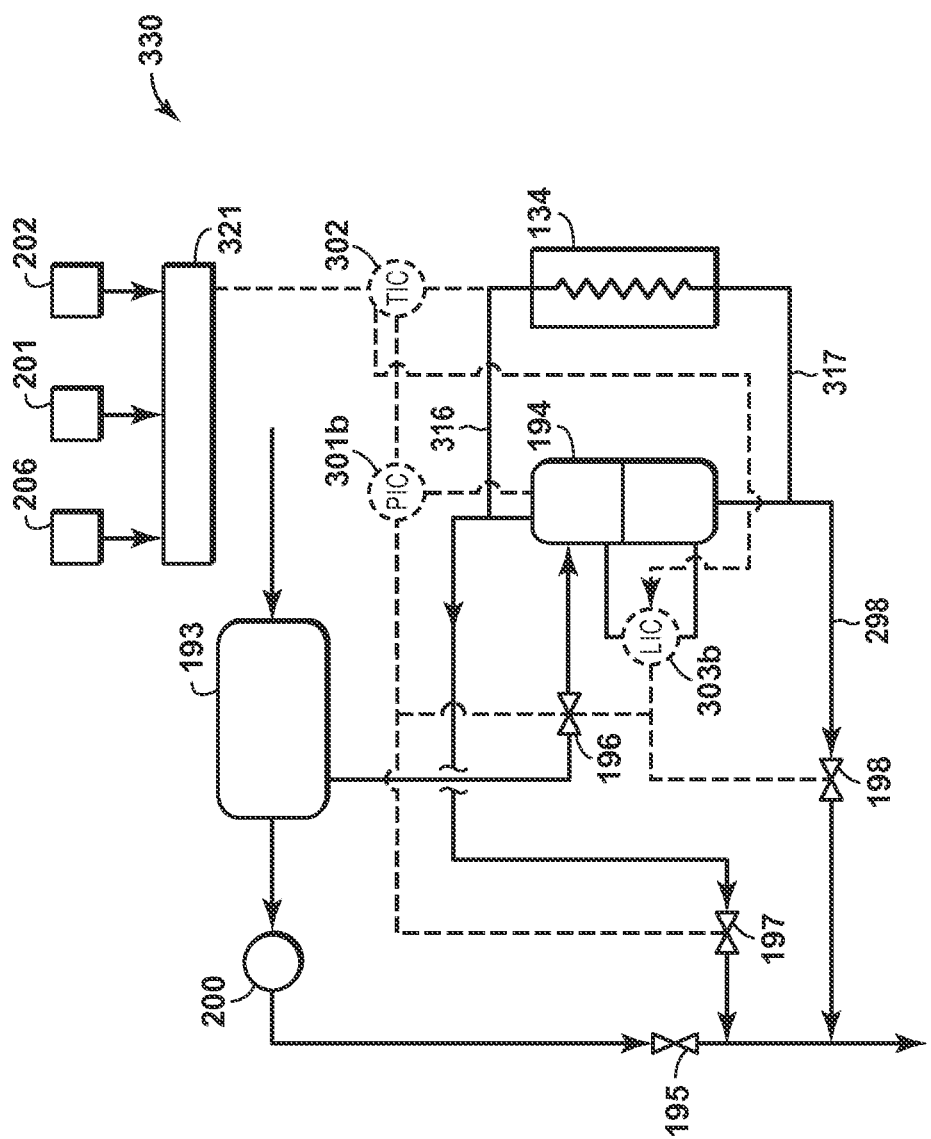
FIG. 3B is a schematic diagram of a portion of FIG. 2.

The closed loop melt tray temperature conditioning system 330 may include a subcooler 200 (FIG. 3B). The subcooler 200 may ensure that refrigerant exiting the overhead refrigeration refrigerant accumulator 193 is cooled down to minimize vapor formation from the liquid. Refrigerant exiting the overhead refrigeration refrigerant accumulator 193 to the subcooler 200 travels to the condenser/evaporator 122, from the condenser/evaporator 122 to the separator 190, from the separator 190 to the compressor 191, from the compressor 191 to the heat exchanger 192 and then back to the overhead refrigeration refrigerant accumulator 193.

At normal operation, the overhead refrigeration refrigerant accumulator 193 feeds the refrigerant to the working fluid reservoir 194. A small stream of the refrigerant may be fed to the working fluid reservoir 194. The small stream may be a stream that does not substantially affect the overhead refrigeration system. Before being introduced into the working fluid reservoir 194, the refrigerant may undergo a pressure and temperature drop across flow controlling device 196. Because of the pressure drop, some of the refrigerant may form a vapor stream. The vapor stream may flow into the melt tray heat exchanging device 134, thereby supplying heat to the melt tray fluid 130. The vapor stream may flow into the melt tray heat exchanging device 134, thereby supplying heat to the melt tray fluid 130 if the vapor condenses. Working fluid within the melt tray heat exchanging device 134, which is formed due to condensation in the melt tray heat exchanging device 134, may be removed from the working fluid reservoir 194 via line 298, 299 and introduced into the condenser/evaporator 122 after undergoing a pressure and temperature drop. The liquid may undergo a pressure and temperature drop after going through flow controlling device 198.

At normal operation, the flow rate of refrigerant being fed from the overhead refrigeration refrigerant accumulator 193 to the working fluid reservoir 194 may be adjusted. The flow rate may be adjusted so that the vapor stream generated due to the pressure and temperature drop across valve 196 is wholly condensed in the melt tray heat exchanging device 134 and the heat of condensation is equal to the heat supply necessary at the melt tray assembly 139 to melt solids within the liquid slurry that would plug the liquid outlet 22.

At normal operation, a working fluid amount of working fluid fed from the overhead refrigeration refrigerant accumulator 193 to the working fluid reservoir 194 may remain constant. The working fluid amount may remain constant because the melt tray fluid temperature is within the expected melt tray fluid temperature range.

At an abnormal operation, which results in a decrease in the melt tray fluid temperature such that the melt tray fluid temperature is less than the expected melt tray fluid temperature range lower limit, there may be a higher amount of working fluid vapor condensed in the melt tray heat exchanging device 134 than during the normal operation, thereby causing a decrease in a working fluid operating pressure. The working fluid operating pressure may interchangeably be referred to as the working fluid pressure. The working fluid temperature and pressure may be increased by increasing a phase changing fluid pressure of the phase changing fluid by increasing the working fluid amount of working fluid fed to the working fluid reservoir 194. The melt tray fluid temperature may be increased by increasing the flow rate of the refrigerant fed from the overhead refrigeration refrigerant accumulator 193 to the working fluid reservoir 194. Because the flow rate is increased, the amount of refrigerant fed to the working fluid reservoir 194 may increase, thereby increasing the working fluid pressure of the working fluid. Increasing the working fluid pressure may increase the temperature at which the working fluid changes phase. When the working fluid pressure is high enough, condensation of the working fluid in the melt tray heat exchanging device 134 may occur, thereby providing more heat to the melt tray fluid and allowing the melt tray fluid temperature to increase to a melt tray fluid temperature within the expected melt tray fluid temperature range. Because the flow rate is increased during abnormal operation, the amount of working fluid in the working fluid reservoir may increase and the liquid level of the working fluid in the working fluid reservoir 194 may increase. After the melt tray fluid temperature returns to being within the expected melt tray fluid temperature range, the flow rates and pressures may return to those at normal operation.

When the melt tray heat exchanging device 134 is a component that allows for separation of the liquid and vapor within the dual phase changing fluid, the liquid removal rate of the working fluid exiting the working fluid reservoir 194 may or may not be increased. If the melt tray heat exchanging device 134 does not allow for separation of liquid and vapor within the dual phase changing fluid, the liquid removal rate of the working fluid exiting the working fluid reservoir 194 may need to be increased to ensure that the working fluid reservoir 194 continues to hold liquid and vapor.

At an abnormal operation, which results in an increase in the melt tray fluid temperature such that the melt tray fluid temperature is greater than the expected melt tray fluid temperature range upper limit, the liquid stream in the melt tray heat exchanging device may start evaporating to cause an increase in the amount of vapor in the melt tray heat exchanging device 134 and an increase in the working fluid pressure. The flow configuration may reverse, thereby causing liquid to enter the bottom of the melt tray heat exchanging device 134 and vapor to exit from the top of the melt tray heat exchanging device 134. As a result of the higher melt tray fluid temperature, more of the working fluid fed to the melt tray heat exchanging device 134 may vaporize than if the melt tray fluid temperature was within the expected melt tray fluid temperature range, thereby resulting in an increase in the amount of working fluid that is a vapor stream in the working fluid reservoir 194. To decrease the melt tray fluid temperature, vapor stream from the working fluid reservoir 194 may be fed to the condenser/evaporator 122 via lines 297, 299 to reduce working fluid pressure and temperature; liquid from the overhead refrigeration refrigerant accumulator 193 may be fed to the working fluid reservoir 194 via lines 196, 296 to supply more liquid to cool the melt tray heat assembly. When the melt tray heat exchanging device 134 is a component that allows for separation of the liquid stream and vapor stream within the dual phase changing fluid, the liquid removal rate of the refrigerant being fed to the working fluid reservoir 194 from the overhead refrigeration refrigerant accumulator 193 may or may not be increased. If the melt tray heat exchanging device 134 does not allow for separation of liquid stream and vapor stream within the dual phase changing fluid, the liquid removal rate of the refrigerant being fed to the working fluid reservoir 194 from the overhead refrigeration refrigerant accumulator 193 may need to be increased to ensure that the working fluid reservoir 194 continues to hold the liquid stream and vapor stream and to decrease the pressure and temperature of the working fluid in the working fluid reservoir 194.

The open loop melt tray temperature conditioning system 430 (FIGS. 6A and 6B) may comprise a working fluid reservoir 294. The working fluid reservoir 294 holds the working fluid that is fed to the melt tray heat exchanging device 134. Working fluid is fed to the melt tray heat exchanging device 134 via lines 316, 317. The working fluid reservoir 294 may receive fluid from the melt tray heat exchanging device 134 via lines 316, 317. The working fluid may comprise any suitable working fluid. For example, the working fluid may comprise one of propane, carbon dioxide, ethane, ammonia, ethylene, an azeotrope of carbon dioxide and ethane, a single halogenated hydrocarbon and a combination of components with a temperature glide that allows the intended purpose of the present disclosure to work. With respect to the combination of components with the temperature glide, the temperature glide may be less than or equal to 10° C. or 18° F. The temperature glide may be any number within and/or bounded by the preceding temperature range. The ethane may be used as an azeotrope with carbon dioxide.

Figure 6A:
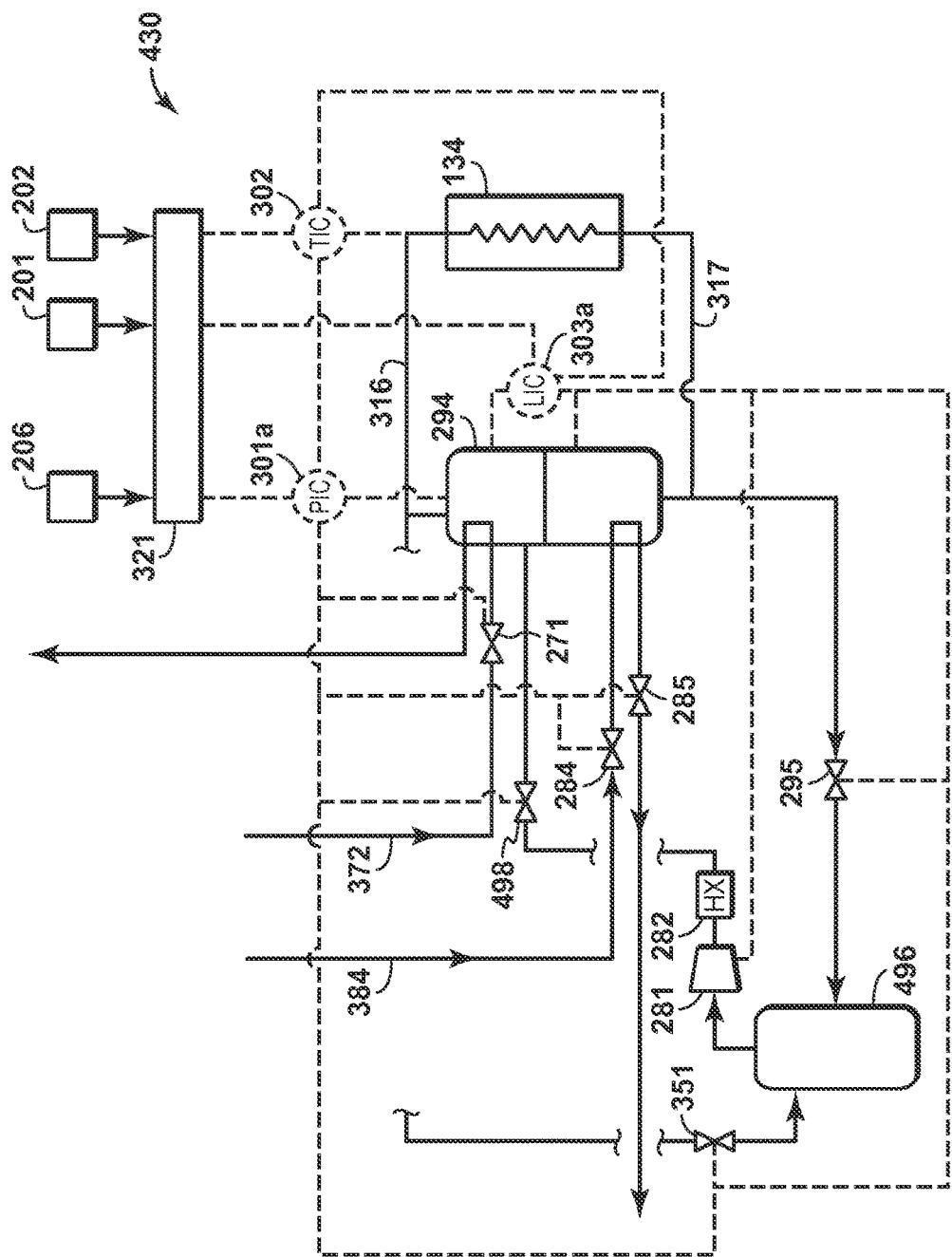
FIG. 6A is a schematic diagram of a portion of FIG. 5.
Figure 6B:
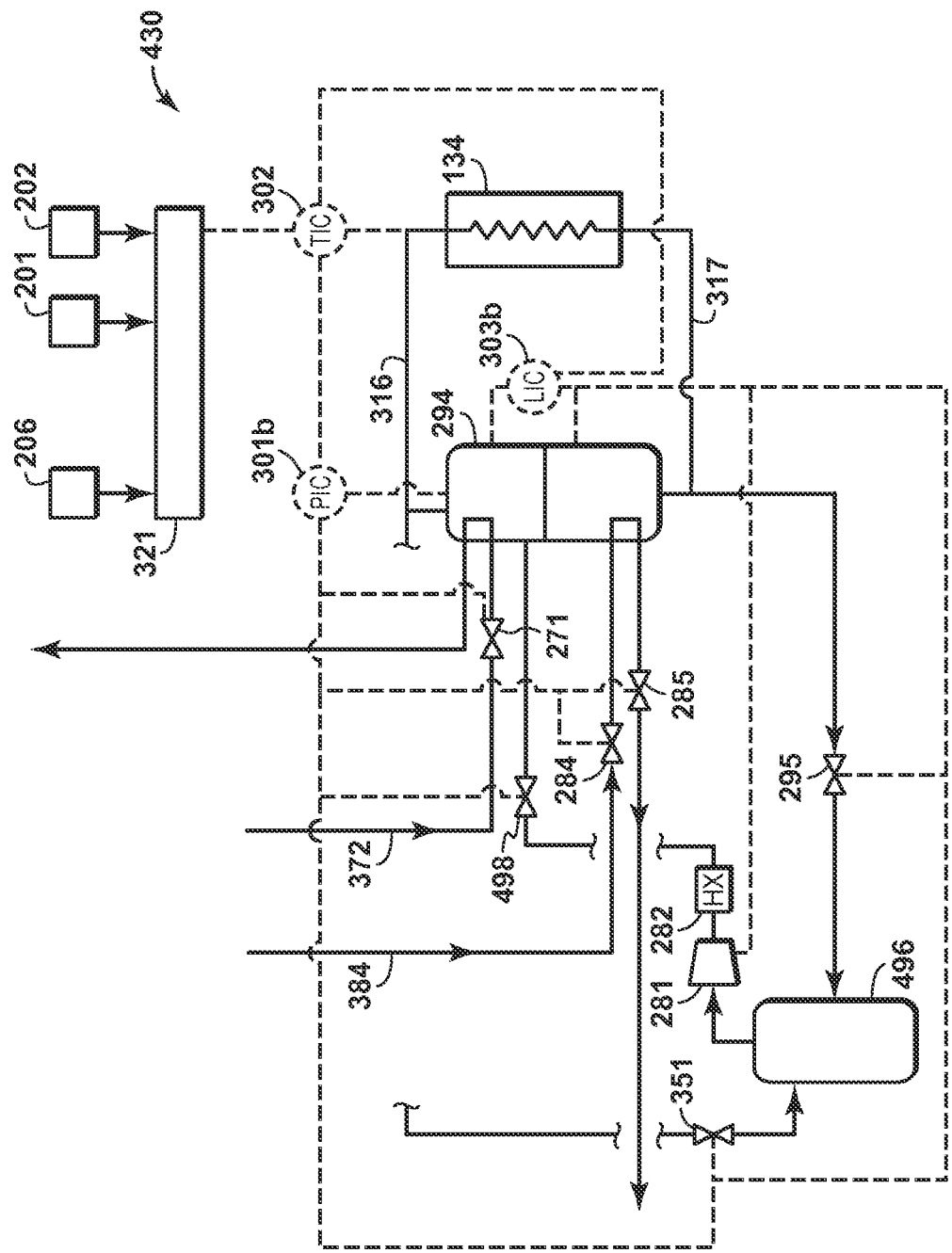
FIG. 6B is a schematic diagram of a portion of FIG. 5.
Figure 7:
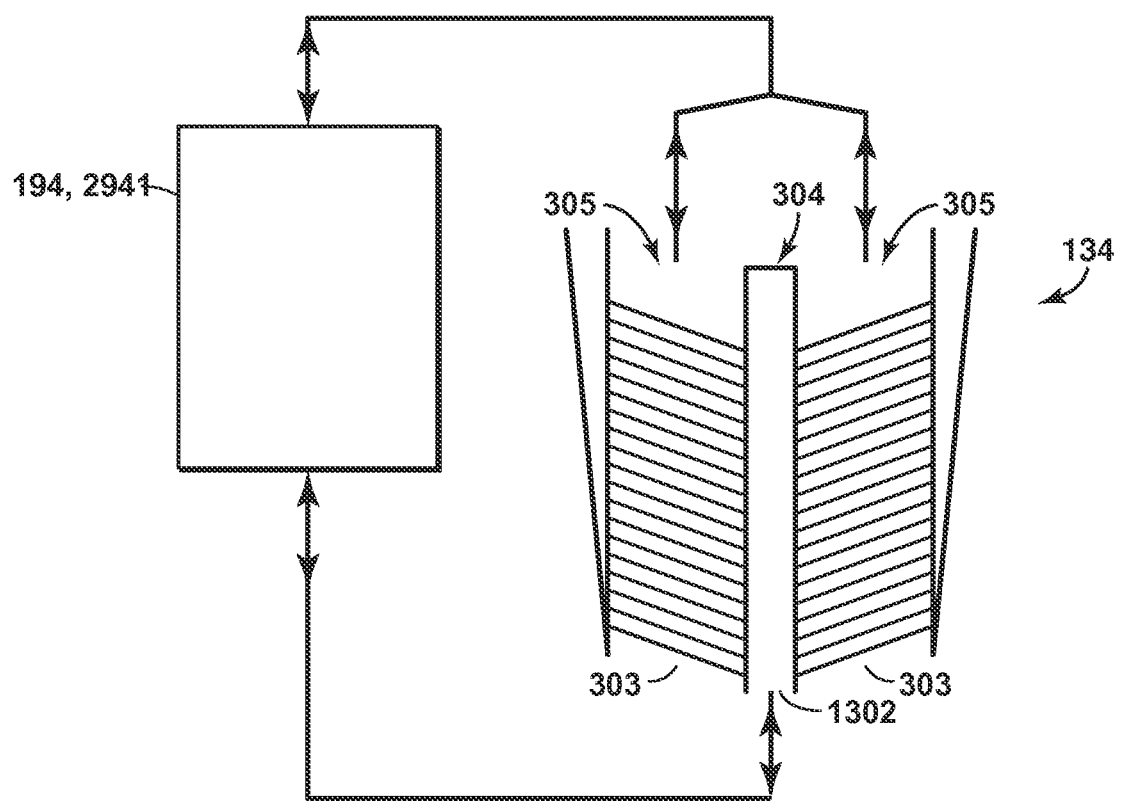
FIG. 7 is a top view of a heat exchanging device.

The open loop melt tray temperature conditioning system 430 shown in FIGS. 6A and 6B may include the heat exchanging device 245 shown in FIGS. 4 and 5. The heat exchanging device 245 may fluidly connect with the upper section 110. The vapor stream that rises to the top of the upper section 110 may exit the upper section 110 through line 14. The vapor stream that exits the upper section 110 may be fed directly to the heat exchanging device 245. The vapor stream fed to the heat exchanging device 245 may be heated in the heat exchanging device 245. After being heated, the stream may exit the heat exchanging device 245 and be fed to a first compressor 1260. The stream may be compressed in the first compressor 1260, then fed to a first cooler 238 to be cooled in a first cooler 238, then fed to a second compressor 1261 to be further compressed in the second compressor 1261, then fed to a second cooler 241 to be further cooled in the second cooler 241, then fed to a third compressor 262 to be further compressed by the third compressor 262, then fed to a third cooler 240 to be further cooled by the third cooler 240 and then sent to sales via line 16. More or fewer of the consecutive coolers 238, 241, 240 and/or compressors 1260, 1261, 262 may be employed.

Some of the vapor stream may be transported to the heat exchanging device 245 via line 208 instead of being sent to sales via line 16. The vapor stream transported to the heat exchanging device 245 instead of being sent to sales via line 16 may heat the stream sent to the consecutive coolers 238, 241, 240 and compressors 1260, 1261, 262 and be cooled by the stream sent to the consecutive coolers 238, 241, 240 and compressors 1260, 1261, 262. After being cooled by the stream sent to the consecutive coolers 238, 241, 240 and compressors 1260, 1261, 262, the stream may be sent to the pressure controlling/reducing device 258.

Some of the vapor stream sent to be cooled in the heat exchanging device 245 may be transported to cool the working fluid within the working fluid reservoir 294 instead of being sent to the pressure controlling/reducing device 258. The stream may travel to the working fluid reservoir 294 via line 372. The stream may be transported to cool the working fluid reservoir 294 when the melt tray fluid temperature is within the expected melt tray fluid temperature range. The stream may cool the working fluid by exchanging heat with the working fluid within the working fluid reservoir 294. The stream may not mix with the working fluid. In other words, the exchange of heat may be a non-contact process.

The line 372 may include a flow controlling device 271 that controls how much and/or at what flow rate the stream travels to the working fluid reservoir 294. When the flow controlling device 271 is open, the stream travels to the working fluid reservoir 294; when the flow controlling device 271 is closed, the stream does not travel to the working fluid reservoir 294. After exchanging heat with the working fluid in the working fluid reservoir 294, the stream may return to the compressor 1260 via line 371.

The open loop melt tray temperature conditioning system 430 (FIGS. 6A and 6B) may include a feed refrigeration refrigerant accumulator 497. The feed refrigeration refrigerant accumulator 497 may house a feed refrigeration refrigerant. The feed refrigeration refrigerant may comprise any suitable feed refrigeration refrigerant such as but not limited to ethane, ethylene, R404a, R410a, triufluoromethane, propane, ammonia, carbon dioxide or a combination of components with a temperature glide that allows the intended purpose of the present disclosure to work. With respect to the combination of components with the temperature glide, the temperature glide may be less than or equal to 10° C. or 18° F. The temperature glide may be any number within and/or bounded by the preceding temperature range. The ethane may be used as an azeotrope with carbon dioxide. The R-# in R404a and R410 refers to a numbering system developed by DuPont that systematically identifies the molecular structure of refrigerants made with a single halogenated hydrocarbon. The number in the R-# is derived by subtracting 90 from concatenated numbers of carbon, hydrogen and fluorine atoms, respectively. A suffix of lower-case letter a, b or c indicates increasingly unsymmetrical isomers. R-404a is a "nearly azeotropic" blend of 52 weight percent R-143a, 44 weight percent R-125 and 4 weight percent R-134a while R-410a is a near-azeotropic blend of R-32 and R-125. The feed refrigeration refrigerant accumulator 497 may comprise any suitable vessel that is able to operate at super-ambient pressures. For example, the feed refrigeration refrigerant accumulator 497 may comprise a pressure-containing vessel or a separator.

The feed refrigeration refrigerant in feed refrigeration refrigerant accumulator 497 may be used to heat the working fluid when the melt tray fluid temperature is below the expected melt tray fluid temperature range. The feed refrigeration refrigerant in the feed refrigeration refrigerant accumulator 497 may travel to the working fluid reservoir 294 via line 384. The feed refrigeration refrigerant may heat the working fluid by exchanging heat with the working fluid. The feed refrigeration refrigerant may not mix with the working fluid. In other words, the exchange of heat may be a non-contact process.

The line 384 may include a flow and pressure controlling device 284 that controls how much the feed refrigeration refrigerant exchanges heat with the working fluid in the working fluid reservoir 294. When the flow controlling device 284 and 285 are open, the feed refrigeration refrigerant exchanges heat with the working fluid in the working fluid reservoir 294; when the flow controlling device 284 is closed, the feed refrigeration refrigerant does not exchange heat with the working fluid reservoir 294.

After exchanging heat with the working fluid in the working fluid reservoir 294, the feed refrigeration refrigerant may travel to heat exchanger 280. The feed refrigeration refrigerant may travel to the heat exchanger 280 and mix with feed refrigeration refrigerant coming from line 383.

The feed refrigeration refrigerant coming from line 384 may travel to line 383 via line 385. The line 385 may include a flow controlling device 285 that controls how much and/or at what flow rate and pressure feed refrigeration refrigerant travels to the heat exchanger 280 via line 380. When the flow controlling device 284 and 285 are open, the feed refrigeration refrigerant continues to the heat exchanger 280; when the flow controlling device 285 is closed, the feed refrigeration refrigerant does not continue to the heat exchanger 280.

Feed refrigeration refrigerant from the feed refrigeration refrigerant accumulator 497 may exchange heat with the stream 10 before the stream 10 enters the distillation tower 104, 204. The feed refrigeration refrigerant may be fed to a heat exchanger 280 via line 380 to exchange heat with the stream 10. The line 380 may include the flow controlling valve 283. The flow controlling valve 283 may control how much feed and/or at what flow rate refrigeration refrigerant is fed to the stream 10. After exchanging heat with the stream 10, the feed refrigeration refrigerant may be fed to a compressor 1200 through line 500. The feed refrigeration refrigerant may be compressed to a higher pressure and a higher temperature by being fed to compressor 1200. After exiting compressor 1200, the feed refrigeration refrigerant may be fed to a cooler 1201. The feed refrigeration refrigerant may be condensed in the cooler 1201. After exiting the cooler 1201, the feed refrigeration refrigerant may be fed to refrigeration refrigerant accumulator 497.

The open-loop melt tray temperature conditioning system 430 may comprise a working fluid make-up tank 496. The working fluid make-up tank 496 may be configured to receive the working fluid from the working fluid reservoir 294 and to feed working fluid to the working fluid reservoir 294 when the melt tray fluid temperature is outside of the expected melt tray fluid temperature range. The working fluid make-up tank 496 may contain working fluid.

The working fluid make-up tank 496 may connect to the working fluid reservoir 294 via lines 395, 451, 398. The line 395 may include a flow controlling device 295 that controls how much working fluid is fed to the working fluid make-up tank 496 from the working fluid reservoir 294. The line 451 may include a flow controlling device 351 that controls how much working fluid is fed to the working fluid make-up tank 496 from the working fluid reservoir 294. The line 398 may include a flow controlling device 498 that controls how much working fluid is fed to the working fluid reservoir 294 and/or at what flow rate from the working fluid make-up tank 496. Before reaching the flow controlling device 498, the working fluid from the working fluid make-up tank 496 may enter a compressor 281, to increase the pressure and temperature of the working fluid, and a condenser 282 to cool the working fluid.

At normal operation, heat may be supplied to the working fluid reservoir 294 to heat the working fluid, thereby vaporizing some of the working fluid within the working fluid reservoir 294. The heat may be supplied by the feed refrigeration refrigerant accumulator 497. The vaporized working fluid may be fed to the melt tray heat exchanging device 134 to supply heat to the melt tray fluid so that the melt tray fluid temperature remains with the expected melt tray temperature range. The feed refrigeration refrigerant that exchanges heat with the working fluid may not mix with the working fluid. In other words, the exchange of heat may be a non-contact process. While exchanging heat with the working fluid in the working fluid reservoir 294, the feed refrigeration refrigerant condenses. After exchanging heat with the working fluid in the working fluid reservoir, the feed refrigeration refrigerant travels to heat exchanger 280 via line 380. The flow rate of the feed refrigeration refrigerant to the working fluid reservoir 294 may be such that the heat of condensation of this stream is substantially equal to the heat needed to heat the melt tray fluid to a melt tray fluid temperature within the expected melt tray fluid temperature range during normal operation.

At an abnormal operation, which results in a decrease in the melt tray fluid temperature such that the melt tray fluid temperature is less than the expected melt tray fluid temperature range lower limit, the melt tray fluid temperature may be increased to a temperature within the expected melt tray temperature range. When there is a decrease in the melt tray fluid temperature, a higher amount of vapor may be condensed in the melt tray heat exchanging device 134, which in turn results in a decrease in the melt tray heat exchanging device operating pressure. To recover from this abnormal operation, a flow rate of feed refrigeration refrigerant, from the feed refrigeration refrigerant accumulator 497, that exchanges heat with the working fluid may be increased. As a result, a higher amount of vapor may be generated in the working fluid reservoir 294, which increases pressure and concomitant higher flow rate to provide more heat to the melt tray heat exchanging device 134 to facilitate recovery of normal operating temperatures. The flow configuration inside the melt tray heat exchanging device 134 may remain the same through this abnormal operation. The flow configuration remaining the same means that vapor enters the top part of the melt tray heat exchanging device 134 while liquid exits from the bottom part of the melt tray heat exchanging device 134 where the bottom part is closer to the lower section 106 than the top part. Once the abnormal operation terminates, the flow rate of the feed refrigeration refrigerant may return to its flow rate at normal operation.

If the increased feed refrigeration refrigerant flow rate does not provide enough heat to the working fluid to return the melt tray fluid temperature to one within the expected melt tray fluid temperature range, the working fluid make-up tank 496 can supply additional working fluid to the working fluid reservoir 294 via line 398. Before entering the working fluid reservoir 294, the working fluid from the working fluid make-up tank 496 may be pressurized via compressor 281 and cooled but not fully condensed in exchanger 282 so that the working fluid from the working fluid make-up tank 496 can warm the working fluid within the working fluid reservoir 294. Any excess working fluid generated due to condensation in the melt tray heat exchanging device 134 may be returned to the working fluid make-up tank 496 via line 395.

At an abnormal operation, which results in an increase in the melt tray fluid temperature such that the melt tray fluid temperature is greater than the expected melt tray fluid temperature range upper limit, the melt tray fluid temperature may be decreased. When there is an increase in the melt tray fluid temperature, liquid in the melt tray heat exchanging device 134 may start evaporating which may result in an increase in the vapor inventory within the working fluid reservoir 294 and melt tray heat exchanging device pressure. When there is an increase in the melt tray fluid temperature, the flow configuration may reverse, thereby causing liquid to enter the bottom of the melt tray heat exchanging device 134 and vapor to exit from the top of the melt tray heat exchanging device 134. To recover from this abnormal operation, a flow rate of the stream from heat exchanging device 245 may be increased. The increased reflux flow rate results in reducing the vapor inventory in the working fluid reservoir 294 and lowering the operating pressure and temperature of the melt tray fluid in the melt tray heat exchanging device 134. Similar to the feed refrigeration refrigerant, the reflux does not mix with the working fluid. In other words, the exchange of heat from the reflux is a non-contact process.

If the increased reflux flow rate does not provide enough cooling to the working fluid to return the melt tray fluid temperature to one within the expected melt tray fluid temperature range, excess vapor generated in the melt tray heat exchanging device 134 may be removed from the top of the working fluid reservoir 294 and fed to the working fluid make-up tank 496 via line 451. This results in a reduction in the amount of working fluid in the melt tray heat exchanging device 134, thereby decreasing the liquid level in the working fluid reservoir 294. The liquid level in the working fluid reservoir 294 may be increased by introducing working fluid from the working fluid make-up tank 496 via line 398. The liquid level may be defined as set forth above.

A control system 321 (FIGS. 3A-3B and 6A-6B) may determine if the distillation tower 104, 204 is at normal operation or abnormal operation. The control system 321 may help the distillation tower 104, 204 remain at normal operation. The control system 321 may help the distillation tower 104, 204 return to normal operation if operating at abnormal operation. The control system 321 may receive input from a pressure sensor 201, a temperature sensor 202, a composition analyzer 206 and a temperature indicating controller 302. The pressure sensor 201 may detect a pressure of the melt tray fluid 130. The temperature sensor 202 may detect a temperature of the melt tray fluid 130. The composition analyzer 206 may analyze a melt tray fluid composition of the melt tray fluid 130. The temperature indicating controller 302 may determine a temperature of the working fluid in a working fluid reservoir 194, 294.

The control system 321 may receive the melt tray fluid composition of the melt tray fluid 130, 503 (FIG. 8). Receiving the melt tray fluid composition may include analyzing a sample of the melt tray fluid with the composition analyzer 206. The sample of (i.e., some portion of) the melt tray fluid 130 may be extracted from the melt tray assembly 139. Receiving the melt tray fluid composition may include determining a percentage of the components within the melt tray fluid based on the analysis conducted with the composition analyzer 206. The components may include at least one of methane, hydrogen sulfide and carbon dioxide. The composition analyzer 206 may be any suitable analyzer, such as for example, a gas chromatograph or Fourier Transform Infra-Red Analyzer.

The control system 321 may receive the melt tray fluid pressure of the melt tray fluid 130, 510 (FIG. 8). The control system 321 may receive the melt tray fluid pressure of the melt tray fluid 130 from the pressure sensor 201. The pressure sensor 201 may determine the melt tray fluid pressure by detecting the melt tray fluid pressure (FIGS. 1-3B and 6A-6B). The pressure sensor 201 may be any suitable sensor, such as, at least one of but not limited to a piezoresistive strain gauge, a capacitive measurement, electromagnetic, piezoelectric optical and/or potentiometric.

The control system 321 may receive the melt tray fluid temperature of the melt tray fluid 130, 504 (FIG. 8). The control system 321 may receive the melt tray fluid temperature of the melt tray fluid 130 from the temperature sensor 202. The temperature sensor 202 may determine the melt tray fluid temperature by detecting the melt tray fluid temperature (FIGS. 1-3B and 6A-6B). The temperature sensor 202 may be any suitable sensor, such as, at least one of a thermocouple, a thermowell and a resistance temperature detector.

The melt tray fluid composition and/or the melt tray fluid pressure may help determine the expected melt tray fluid temperature of the melt tray fluid 130. The expected melt tray fluid temperature may be greater than a melt tray fluid freezing temperature. The melt tray fluid freezing temperature is the temperature at which the melt tray fluid freezes. There are several ways in which the melt tray fluid composition and/or the melt tray fluid pressure may determine the expected melt tray fluid temperature. Examples include, but are not limited to, using look-up tables, activity coefficient models, equations of state, thermodynamic databases and/or thermodynamic software packages.

The control system 321 may compare the melt tray fluid temperature to the expected melt tray fluid temperature range to determine if the melt tray fluid temperature is within or outside of the melt tray fluid temperature range.

The control system 321 may determine if the melt tray fluid temperature detected by the temperature sensor 202 is within the expected melt tray fluid temperature range for the melt tray fluid composition of the melt tray fluid 130 detected by the composition analyzer 206, 505 and/or the melt tray fluid pressure detected by the pressure sensor 201, 501 (FIG. 8).

After determining if the melt tray fluid temperature is within the expected melt tray fluid temperature range, the control system 321 may assist in decreasing the melt tray fluid temperature if the melt tray fluid temperature is greater than the expected melt tray fluid temperature range upper limit, increasing the melt tray fluid temperature if the melt tray fluid temperature is less than the expected melt tray fluid temperature range lower limit, and maintaining the melt tray fluid temperature if the melt tray fluid temperature is within the temperatures of expected melt tray fluid temperature range, 506 (FIG. 8). Specifically, if the melt tray fluid temperature is greater than the expected temperate range upper limit, the control system 321 may communicate with the melt tray temperature conditioning system 330, 430 to decrease the melt tray fluid temperature; if the melt tray fluid temperature is less than the expected melt tray fluid temperature range lower limit, the control system 321 may communicate with the melt tray temperature conditioning system 330, 430 to increase the melt tray fluid temperature; and if the melt tray fluid temperature is within the expected melt tray fluid temperature range, the control system 321 may communicate with the melt tray temperature conditioning system 330, 430 to maintain the melt tray fluid temperature.

As shown in FIGS. 3A and 6A, the control system 321 may also receive input from a pressure indicating controller 301a and a liquid level indicating controller 303a. The pressure indicating controller 301a may determine a pressure of the working fluid in the working fluid reservoir 194, 294. The pressure indicating controller 301a may assist the control system 321 in communicating with flow controlling device(s) to adjust the pressure of the working fluid. The liquid level indicating controller 303a may determine a liquid level of the working fluid in the working fluid reservoir 194, 294. The liquid level indicating controller 303a may assist the control system 321 in communicating with flow controlling device(s) to adjust the liquid level of the working fluid. The liquid level indicating controller 303a may be any suitable indicator, such as but not limited to, a level gauge, a differential pressure indicator or a guided wave radar device. The liquid level in the working fluid reservoir 194, 294 is the point of intersection between the liquid and vapor within the working fluid reservoir 194, 294. As shown in FIGS. 3A and 6A, the control system 321 may use the inputs from at least one of the pressure sensor 201, the temperature sensor 202, the composition analyzer 206, the temperature indicating controller 302, the pressure indicating controller 301a and the liquid level indicating controller 303a to determine if the distillation tower 104 is at normal operation or abnormal operation.

Based on detections and/or analysis from at least one of the pressure sensor 201, the temperature sensor 202, the composition analyzer 206, the temperature indicating controller 302, the pressure indicating controller 301a and the liquid level indicating controller 303a, the control system 321 may determine whether a modification needs to occur (FIGS. 3A and 6A) for the melt tray fluid temperature to be within the expected melt tray fluid temperature range. For example but not limited to, based on detections from the temperature indicating controller 302 and/or the pressure indicator 301a, the control system 321 may determine that the flow rate of the working fluid needs to be increased or decreased. When this occurs, the control system 321 may include a control algorithm that controls the flow rate of the working fluid by communicating with the melt tray temperature conditioning system, 330, 430.

For a closed loop melt tray temperature conditioning system (FIG. 3A) and an open loop melt tray temperature conditioning system (FIG. 6A), the control system 321 may receive the liquid level in the working fluid reservoir 194, 294. The control system 321 may receive the liquid level from a liquid level indicating controller 303a. The liquid level determined by the liquid level indicating controller 303a may be analyzed by the control system 321 and, based on the analysis, the control system 321 may determine the flow rate of the working fluid entering the working fluid reservoir; it may determine the flow rate of working fluid vapor and working fluid liquid leaving the working fluid reservoir. The control system 321 may determine that the liquid level needs to be modified using the liquid level indicating controller 303a, the pressure indicating controller 301a and/or the temperature indicating controller 302.

For the closed loop melt tray temperature conditioning system (FIG. 3A), flow controlling devices 196, 197, 198 may help modify the liquid level once the control system 321 determines that the liquid level needs to be modified. The control system 321 may send signals to the flow controlling devices 196, 197, 198 to modify the liquid level. If the control system 321 receives a signal from the temperature indicating controller 302 that the temperature needs to be increased, flow controlling device 196 opens up which increases the pressure within the working fluid reservoir 194 and the pressure indicating controller 301a reads that. The increased pressure within the working fluid reservoir 194 may result in an increased temperature within the working fluid reservoir 194, which in turn may result in increased heat transfer rate to the melt tray assembly. The increased heat transfer to the melt tray assembly may help cause the working fluid to condense and the liquid level to rise. The liquid level indicating controller 303a reads the raised liquid level and flow controlling device 198 opens up to decrease the liquid level. If the control system 321 receives a signal from the temperature indicating controller 302 that the temperature needs to be decreased, flow controlling device 197 opens up to remove vapor from the working fluid reservoir 194. Opening up the flow controlling device 197 to remove the vapor from the working fluid reservoir 194, may lower the working fluid pressure and working fluid temperature. Lowering the working fluid pressure and the working fluid temperature may result in evaporation of working fluid in the melt tray heat exchange device. The evaporation of the working fluid in the melt tray heat exchanging device may cause the melt tray assembly to cool down.

For the closed loop melt tray temperature conditioning system (FIG. 3A), the control system 321 may determine whether the flow rate of refrigerant being fed from an overhead refrigeration refrigerant accumulator 193 to the working fluid reservoir 194 and/or the working fluid being fed from the working fluid reservoir 194 to the condenser/evaporator 122 needs to be changed. To determine whether the flow rate of refrigerant being fed from the overhead refrigeration refrigerant accumulator 193 to the working fluid reservoir 194 needs to be changed, the control system 321 may analyze at least one of the melt tray fluid temperature detected by the temperature sensor 202, the melt tray fluid pressure detected by the pressure sensor 201, the liquid level within the working fluid reservoir 194 detected by the liquid level indicating controller 303a, the melt tray fluid composition detected by the composition analyzer 206, the temperature of the working fluid within the working fluid reservoir 194 detected by the temperature indicating controller 302 and the pressure of the working fluid within the working fluid reservoir 194 detected by the pressure indicating controller 301a. Analyzing one or more of these components helps in determining how close to freezing the melt tray fluid is. To determine whether the flow rate of working fluid being fed from the working fluid reservoir 194 needs to be changed, the control system 321 may analyze at least one of the melt tray fluid temperature detected by the temperature sensor 202, the melt tray fluid pressure detected by the pressure sensor 201, the liquid level within the working fluid reservoir 194 detected by the liquid level indicating controller 303a, the melt tray fluid composition detected by the composition analyzer 206, the temperature of the working fluid within the working fluid reservoir 194 detected by the temperature indicating controller 302 and the pressure of the working fluid within the working fluid reservoir 194 detected by the pressure indicating controller 301a.

For the open loop melt tray temperature conditioning system (FIG. 6A), flow controlling devices 271, 284, 285, 295 may help modify the liquid level once the control system 321 determines that the liquid level needs to be modified. The control system 321 may send signals to the flow controlling devices 271, 284, 285, 295, 498 to modify the liquid level. If the control system 321 receives a signal from the temperature indicating controller 302 that the temperature needs to be increased, flow controlling device 271 open up which increases the pressure within the working fluid reservoir 294 and the pressure indicating controller 301a reads that. The increased pressure within the working fluid reservoir 294 may result in increased temperature within the working fluid reservoir 294, which in turn may result in increased heat transfer rate to the melt tray assembly. The increased heat transfer to the melt tray assembly may help cause the working fluid to condense and the liquid level to rise. The liquid level indicating controller 303a reads the raised liquid level and flow controlling device 295 open up to decrease the liquid level. If the control system 321 receives a signal from the temperature indicating controller 302 that the temperature needs to be decreased, flow controlling device 351 opens up to remove vapor from the working fluid reservoir 294. Opening up the flow controlling device 351 to remove the vapor from the working fluid reservoir 294 may lower the working fluid pressure and working fluid temperature. Lowering the working fluid pressure and the working fluid temperature may result in evaporation of working fluid in the melt tray heat exchange device. The evaporation of the working fluid in the melt tray heat exchanging device may cause the melt tray assembly to cool down.

For the open loop melt tray temperature conditioning system (FIG. 6A), the control system 321 may determine whether the flow rate of refrigerant being fed from the feed refrigeration refrigerant accumulator 497 to the working fluid reservoir 294 needs to be changed. To determine whether the flow rate of refrigerant being fed from the feed refrigeration refrigerant accumulator 497 to the working fluid reservoir 294 needs to be changed and/or the flow rate of the stream being fed from the heat exchanging device 245 to the working fluid reservoir 294 needs to be changed, the control system 321 may analyze at least one of the melt tray fluid temperature detected by the temperature sensor 202, the melt tray fluid pressure detected by the pressure sensor 201, the liquid level within the working fluid reservoir 294 detected by the liquid level indicating controller 303a, the melt tray fluid composition detected by the composition analyzer 206, the temperature of the working fluid within the working fluid reservoir 194 detected by the temperature indicating controller 302 and the pressure of the working fluid within the working fluid reservoir 294 detected by the pressure indicating controller 301a. Analyzing one or more of these components helps in determining how close to freezing the melt tray fluid is. To determine whether the flow rate of refrigerant fed from the working fluid reservoir 294 needs to be changed, the control system 321 may analyze at least one of the melt tray fluid temperature detected by the temperature sensor 202, the melt tray fluid pressure detected by the pressure sensor 201, the liquid level within the working fluid reservoir 294 detected by the liquid level indicating controller 303a, the melt tray fluid composition detected by the composition analyzer 206, the temperature of the working fluid within the working fluid reservoir 294 detected by the temperature indicating controller 302 and the pressure of the working fluid within the working fluid reservoir 294 detected by the pressure indicating controller 301a.

As shown in FIGS. 3B and 6B and unlike what is shown in FIGS. 3A and 6A, the control system 321 may not receive input from a pressure indicating controller 301b and a liquid level indicating controller 303b. The temperature indicating controller 302 may assist the control system 321 in communicating with the pressure indicating controller 301b and the liquid level indicating controller 303b. The pressure indicating controller 301b may determine a pressure of the working fluid in the working fluid reservoir 194, 294. The pressure indicating controller 301b may communicate with a flow controlling device(s) to adjust the pressure of the working fluid after receiving a signal from the temperature indicating controller 302. The liquid level indicating controller 303b may determine a liquid level of the working fluid in the working fluid reservoir 194, 294. The liquid level indicating controller 303a may communicate with flow controlling device(s) to adjust the liquid level of the working fluid after receiving a signal from the temperature indicating controller 302. The liquid level indicating controller 303b may be any suitable indicator, such as but not limited to, a level gauge, a differential pressure indicator or a guided wave radar device. The liquid level in the working fluid reservoir 194, 294 is the point of intersection between the liquid and vapor within the working fluid reservoir 194, 294. As shown in FIGS. 3B and 6B, the control system 321 may use the inputs from at least one of the pressure sensor 201, the temperature sensor 202, the composition analyzer 206, and the temperature indicating controller 302 to determine if the distillation tower 104 is at normal operation or abnormal operation.

Based on readings from at least one of the pressure sensor 201, the temperature sensor 202, the composition analyzer 206 and the temperature indicating controller 302, the control system 321 may determine whether a modification needs to occur (FIGS. 3B and 6B) for the melt tray fluid temperature to be within the expected melt tray fluid temperature range. For example, but not limited to, based on readings from the temperature indicating controller 302, the control system 321 may determine that the pressure of the working fluid needs to be increased or decreased. When this occurs, the control system 321 may include a control algorithm that controls the pressure by communicating with the melt tray temperature conditioning system 330, 430.

For a closed loop melt tray temperature conditioning system (FIG. 3B) and an open loop temperature conditioning system (FIG. 6B), the control system 321 may determine the temperature of the working fluid using the temperature indicating controller 302. Based on the temperature of the working fluid, the melt tray fluid temperature, the melt tray fluid pressure and/or the melt tray fluid composition, the control system 321 may determine that the temperature of the working fluid needs to be modified (e.g., increased or decreased) and/or the pressure of the working fluid needs to be modified for the melt tray fluid temperature to be within the expected melt tray fluid temperature range. The control system 321 may send this determination to the temperature indicating controller 302. The temperature indicating controller 302 may communicate with the pressure indicating controller 301b and/or the liquid level indicating controller 303b as necessary. When the temperature indicating controller 302 communicates with the pressure indicating controller 301b it may tell the pressure indicating controller 301b that the working fluid pressure needs to be increased or decreased. When the temperature indicating controller 302 communicates with the liquid level indicating controller 303b it may tell the liquid level indicating controller 303b that the liquid level of the working fluid needs to be increased or decreased.

For a closed loop melt tray temperature conditioning system, when the temperature indicating controller 302 communicates with the pressure indicating controller 301b, the pressure indicating controller 301b communicates with flow controlling device 196 and/or flow controlling device 197 so that the flow controlling device 196 and/or flow controlling device 197 can open more or close more as needed to modify the working fluid pressure and, therefore, the melt tray fluid temperature. When the temperature indicating controller 302 communicates with the liquid level indicating controller 303b, the liquid level indicating controller 303b communicates with flow controlling device 198 and/or flow controlling device 196 as needed to modify the liquid level, and therefore, the melt tray fluid temperature. For example, if the control system 321 determines the melt tray fluid temperature needs to increase for the melt tray fluid temperature to be within the expected melt tray fluid temperature range, the control system 321 may communicate with temperature indicating controller 302. In turn, the temperature indicating controller 302 may communicate to the pressure indicating controller 301b that the pressure needs to increase; the temperature indicating controller 302 may communicate to the liquid level indicating controller 303b that the liquid level needs to remain the same. As a result, pressure indicating controller 301b communicates with flow controlling device 196 to open up more resulting in more working fluid entering the working fluid reservoir and increasing the pressure of the working fluid. However, as liquid and vapor enter the working fluid reservoir, the liquid level within the working fluid reservoir may rise. As a result, the liquid level indicating controller 303b may communicate with flow controlling device 198 to open up more. As another example, if the control system 321 determines that the melt tray fluid temperature needs to decrease for the melt tray fluid temperature to be within the expected melt tray fluid temperature range, the control system 321 may communicate with the temperature indicating controller 302. In turn, the temperature indicating controller 302 may communicate to the pressure indicating controller 301b that the pressure needs to decrease and communicates to the liquid level indicator 303b so that the liquid level remains the same. As a result, pressure indicating controller 301b communicates with flow controlling device 197 to open up more. However, this may cause some of the liquid to flash into vapor, potentially resulting in a drop in the liquid level within the reservoir. Therefore, liquid level indicating controller 303b may communicate with flow controlling device 196 to open up more.

For an open loop melt tray temperature conditioning system (FIG. 6B), when the temperature indicating controller 302 communicates with the pressure indicating controller 301b, the pressure indicating controller 301b communicates with a flow controlling device 271, 284, 285 and/or 498 so that the flow controlling device 271, 284, 285 and/or 498 can open more or close more as needed to modify the working fluid pressure. When the temperature indicating controller 302 communicates with the liquid level indicating controller 303b, the liquid level indicating controller 303b communicates with flow controlling device 295 and/or compressor 281 as needed to modify the liquid level. For example, if the control system 321 determines that melt tray fluid temperature needs to increase for the melt tray fluid temperature to be within the expected melt tray fluid temperature range, temperature indicating controller 302 communicates to the pressure indicating controller 301b that the pressure needs to increase. As a result, pressure indicating controller 301b communicates with flow controlling device 284 and/or 285 to open up more. As another example, if the control system 321 determines that pressure needs to decrease for the melt tray fluid temperature to be within the expected melt tray fluid temperature range, temperature indicating controller 302 communicates to the pressure indicating controller 301b that the pressure needs to decrease. As a result, pressure indicating controller 301b communicates with flow controlling device 271 to open up more and/or flow controlling device 351 to open up more, while closing flow controlling device 284 more.

For abnormal operations, similar to what is described above for the open loop and closed loop melt tray temperature conditioning systems 330, 430 the liquid level may or may not be compensated for if the melt tray heat exchanging device 134 comprises a component that allows for separation of the liquid and vapor within the dual phase changing fluid.

The melt tray heat exchanging device 134 may be any suitable device that can hold a phase changing fluid. For example, the melt tray heat exchanging device may comprise a melt coil, plates or finned, serpentine tubes.

The melt tray heat exchanging device 134 may comprise a component, such as but not limited to a wick, that allows for contact of the liquid and vapor within the dual phase changing fluid. The wick (FIG. 7) may comprise a substantially liquid core portion 1302 and a substantially vapor core portion 303. At normal operation, the substantially liquid core portion 302 may receive liquid that is in the phase changing fluid. At normal operation, the substantially vapor core portion 303 may receive vapor that is in the phase changing fluid. At normal operation, the substantially liquid core portion 303 may be located within an inner portion 304 of the wick. At normal operation, the substantially vapor core portion 303 may be located within an outer portion 305 of the wick. At normal operation, the outer portion 305 may surround the inner portion 304. At normal operation of the distillation tower 104, 204, vapor within the substantially vapor core portion 303 may condense and flow from the outer portion 305 and through the wick to the substantially liquid core portion 1302 in the inner portion 304. At an abnormal operation of the distillation tower 104, 204 where the temperature of the melt tray fluid 130 needs to be increased to ensure adequate melting of the solids, vapor within the substantially vapor core portion 303 may flow from the outer portion 305 and through the wick to the substantially liquid core portion 1302 in the inner portion 304. At abnormal operation where the temperature of the melt tray fluid 130 needs to be decreased to ensure adequate separation performance of the contaminants from the hydrocarbons within the stream, liquid within the substantially liquid core portion 1302 may flow from the inner portion 304 and through the wick to the substantially vapor core portion 303 in the outer portion 305. When liquid flows from the substantially liquid core portion 1302 to the substantially vapor core portion 1302, more liquid evaporates.

If the melt tray heat exchanging device 134 comprises a wick, the orientation of the melt tray heat exchanging device 134 with respect to the working fluid reservoir 194, 294 may be such that the wick is one of substantially at a same vertical location and not substantially at a same vertical location with the working fluid reservoir 194, 294. The orientation of the melt tray heat exchanging device 134 with respect to the working fluid reservoir 194, 294 may also be such that the horizontal location of the melt tray heat exchanging device 134 to the working fluid reservoir 194, 294 is unimportant. The vertical location refers to a location along a longitudinal axis 310-310 of the distillation tower 104, 204 (FIGS. 1-2 and 4-5). The horizontal location refers to a location along a lateral axis of the distillation tower 104, 204 where the lateral axis is perpendicular to the longitudinal axis 310-310. The melt tray heat exchanging device 134 may be in any vertical and/or horizontal location with respect to the working fluid reservoir 194, 294 because the wick allows for the mixing of vapor and liquid due to the wick's substantially vapor core portion 303 and substantially liquid core portion 1302.

If the melt tray heat exchanging device 134 does not comprise a device, such as a wick, that allows for mixing of vapor and liquid, the orientation of the melt tray heat exchanging device 134 with respect to the working fluid reservoir 194, 294 may be one where the melt tray heat exchanging device 134 is at a same vertical location or substantially a same vertical location with the working fluid reservoir 194, 294. The melt tray heat exchanging device 134 may be at a same vertical location or substantially a same vertical location with the working fluid reservoir 194, 294 because the center 313 of the melt tray heat exchanging device 134 may be at a same vertical location or substantially a same vertical location as the center 312 of the working fluid reservoir 194, 294. If the melt tray heat exchanging device 134 is not at the same vertical location or substantially the same vertical location with the working fluid reservoir 194, 294, when the melt tray heat exchanging device 134 does not allow for mixing of vapor and liquid, only a single phase of the dual phase changing fluid may be within the melt tray heat exchanging device 134, thereby leading to the disadvantages associated with a single phase fluid heat exchanging device.

The melt tray fluid 130 may be heated by at least one of the vapor stream rising from the lower section 106 and the melt tray heat exchanging device 134. The melt tray fluid 130 helps melt the solids formed in the middle controlled freeze zone section 108 into the liquid slurry. Specifically, the heat transferred by the vapor stream heats up the liquid, thereby enabling the heat to melt the solids.

One or more bubble caps 132 may act as a channel for the vapor stream rising from the lower section 106 to the middle controlled freeze zone section 108. Each bubble cap 132 may provide a path for the vapor stream that forces the vapor stream up the riser 140 and then down and around the riser 140 to the melt tray 118. The riser 140 is covered by a cap 141. The cap 141 prevents the melt tray fluid 130 from travelling into the riser 140. The cap 141 helps prevent solids from travelling into the riser 140. The vapor stream's traversal through the bubble cap 132 allows the vapor stream to transfer heat to the melt tray fluid 130 within the melt tray assembly 139.

The middle controlled freeze zone section 108 may comprise a spray assembly 129. The spray assembly 129 cools the vapor stream that rises from the lower section 40. The spray assembly 129 sprays liquid, which is cooler than the vapor stream, on the vapor stream to cool the vapor stream. The spray assembly 129 is within the upper section 39 of the middle controlled freeze zone section 108. The spray assembly 129 is not within the lower section 40 of the middle controlled freeze zone section 108. The spray assembly 129 is above the melt tray assembly 139. In other words, the melt tray assembly 139 is below the spray assembly 129.

The temperature of the vapor stream falls as it travels from the bottom of the middle controlled freeze zone section 108 to the top of the middle controlled freeze zone section 108. The concentration of methane in the vapor stream rises as it moves from the middle controlled freeze zone section 108 to the upper section 110. Some contaminants may remain in the methane and also rise. Substantially all contaminants in the vapor stream tend to condense or solidify with the colder temperatures and fall to the bottom of the middle controlled freeze zone section 108.

The solids form the liquid slurry when in the melt tray fluid 130. The liquid slurry flows from the middle controlled freeze zone section 108 to the lower distillation section 106. The liquid slurry mix flows from the bottom of the middle controlled freeze zone section 108 to the top of the lower section 106 via line 22 (FIGS. 1-4). The line 22 may be an exterior line. The line 22 may extend from the distillation tower 104, 204. The line 22 may extend from the middle controlled freeze zone section 108. The line may extend to the lower section 106.

The steps depicted in FIG. 8 are provided for illustrative purposes only and a particular step may not be required to perform the inventive methodology. Moreover, FIG. 8 may not illustrate all the steps that may be performed. The claims, and only the claims, define the inventive system and methodology.

Disclosed aspects may be used in hydrocarbon management activities. As used herein, "hydrocarbon management" or "managing hydrocarbons" includes hydrocarbon extraction, hydrocarbon production 507 (FIG. 8), hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used in extracting hydrocarbons from a subsurface region and processing the hydrocarbons. Hydrocarbons and contaminants may be extracted from a reservoir and processed. The hydrocarbons and contaminants may be processed, for example, in the distillation tower previously described. After the hydrocarbons and contaminants are processed, the hydrocarbons may be extracted from the processor, such as the distillation tower, and produced. The contaminants may be discharged into the Earth, etc. For example, as shown in FIG. 8, the method for producing hydrocarbons may include producing the hydrocarbon-enriched vapor stream extracted from the distillation tower. The method may also include removing the hydrocarbon-enriched vapor stream from the distillation tower before producing the hydrocarbon-enriched vapor stream. The initial hydrocarbon extraction from the reservoir may be accomplished by drilling a well using hydrocarbon drilling equipment. The equipment and techniques used to drill a well and/or extract these hydrocarbons are well known by those skilled in the relevant art. Other hydrocarbon extraction activities and, more generally, other hydrocarbon management activities, may be performed according to known principles.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method of controlling a temperature within a melt tray assembly of a distillation tower, comprising:
    maintaining a controlled freeze zone section of the distillation tower that forms a solid and a vapor from a stream that enters the distillation tower;
    maintaining a melt tray assembly, within the controlled freeze zone section, that comprises a melt tray fluid and a melt tray heat exchanging device within the melt tray fluid;
    providing a phase changing fluid, to the melt tray heat exchanging device, that is configured to be a dual-phase heat transfer fluid;
    determining a melt tray fluid composition of the melt tray fluid;
    determining a melt tray fluid pressure of the melt tray fluid;
    determining a melt tray fluid temperature of the melt tray fluid;
    determining if the melt tray fluid temperature is within an expected melt tray fluid temperature range for the melt tray fluid composition and the melt tray fluid pressure, wherein the expected melt tray fluid temperature range has an expected melt tray fluid temperature range upper limit and an expected melt tray fluid temperature range lower limit;

decreasing the melt tray fluid temperature if the melt tray fluid temperature is greater than the expected melt tray fluid temperature range upper limit, increasing the melt tray fluid temperature if the melt tray fluid temperature is less than the expected melt tray fluid temperature range lower limit, and maintaining the melt tray fluid temperature if the melt tray fluid temperature is within the expected melt tray fluid temperature range.

2. The method of claim 1, wherein the phase changing fluid comprises a single-component fluid.

3. The method of claim 2, wherein the single-component fluid comprises one of ethane, ethylene, and trifluoromethane.

4. The method of claim 1, wherein determining the melt tray fluid composition comprises extracting a sample of the melt tray fluid; analyzing the sample of the melt tray fluid with a composition analyzer; and determining a percentage of components within the melt tray fluid.

5. The method of claim 4, wherein the components comprise at least one of methane, hydrogen sulfide, and carbon dioxide.

6. The method of claim 1, wherein determining the melt tray fluid temperature comprises sensing the melt tray fluid temperature with a temperature indicating controller.

7. The method of claim 6, wherein the temperature indicating controller comprises at least one of a thermocouple, thermowell, and resistance temperature detector.

8. The method of claim 1, wherein decreasing the melt tray fluid temperature comprises one of (i) decreasing a phase changing fluid pressure of the phase changing fluid and (ii) increasing a flow rate of reflux, from a reflux accumulator, exchanging heat with a working fluid.

9. The method of claim 8, wherein (i) occurs in a closed loop refrigeration system and (ii) occurs in an open loop refrigeration system.

10. The method of claim 1, wherein increasing the melt tray fluid temperature comprises one of (i) increasing a phase changing fluid pressure of the phase changing fluid and (ii) increasing a flow rate of feed refrigeration refrigerant, from a feed refrigeration refrigerant accumulator, exchanging heat with a working fluid.

11. The method of claim 10, wherein (i) occurs in a closed loop refrigeration system and (ii) occurs in an open loop refrigeration system.

12. The method of claim 1, wherein maintaining the melt tray fluid temperature comprises one of (i) maintaining a working fluid amount fed to the phase changing fluid and (ii) maintaining a flow rate of reflux, from a reflux accumulator, and feed refrigeration refrigerant, from a feed refrigeration refrigerant accumulator, to a fixed-volume phase changing fluid system.

13. The method of claim 12, wherein (i) occurs in a closed loop refrigeration system and (ii) occurs in an open loop refrigeration system.

14. The method of claim 1, wherein the expected melt tray fluid temperature range is between −65° F. to −100° F.

15. The method of claim 1, further comprising:
producing hydrocarbon fluids from the distillation tower.

16. The method of claim 1, wherein the melt tray heat exchanging device comprises a wick.

17. The method of claim 16, wherein the wick comprises a substantially liquid core portion and a substantially vapor portion, wherein the substantially liquid core portion receives liquid of the phase changing fluid and the substantially vapor portion receives vapor of the phase changing fluid.

18. The method of claim 16, wherein the wick is substantially at a same vertical location as a working fluid reservoir.

19. The method of claim 16, wherein the wick is not substantially at a same vertical location as a working fluid reservoir.

20. The method of claim 1, wherein the phase changing fluid comprises an azeotropic blend.

21. A system of controlling a temperature within a melt tray assembly of a distillation tower, comprising:
a distillation tower configured to process a stream, wherein the distillation tower comprises a controlled freeze zone section that separates the stream into solids and vapor, the controlled freeze zone section having a melt tray assembly including a melt tray fluid and a melt tray heat exchanging device within the melt tray fluid, wherein the melt tray heat exchanging device holds a phase changing fluid that is a dual-phase heat transfer fluid;
a control system that determines if a melt tray fluid temperature of the melt tray fluid is within an expected melt tray fluid temperature range for a melt tray fluid composition and pressure of the melt tray fluid; and
a melt tray temperature conditioning system that feeds the phase changing fluid to the melt tray heat exchanging device and is configured to modify a melt tray fluid temperature of the melt tray fluid if the melt tray fluid temperature is outside of the expected melt tray fluid temperature range.

22. The system of claim 21, wherein the phase changing fluid comprises a single-component fluid.

23. The system of claim 21, wherein the expected melt tray fluid temperature range is between −65° F. to −100° F.

24. The system of claim 21, wherein the melt tray temperature conditioning system comprises a closed loop melt tray temperature conditioning system.

25. The system of claim 24, wherein the closed loop melt tray temperature conditioning system comprises a working fluid reservoir, that holds working fluid and that feeds the working fluid to the melt tray heat exchanging device, an overhead refrigeration refrigerant accumulator, that holds the working fluid and is configured to selectively feed the working fluid to the working fluid reservoir, and an heat exchanger that is configured to selectively receive the working fluid from the working fluid reservoir.

26. The system of claim 25, wherein the working fluid comprises one of ethane, propane, carbon dioxide, and a single halogenated hydrocarbon.

27. The system of claim 21, wherein the melt tray heat exchanging device comprises a wick.

28. The system of claim 27, wherein the wick comprises a substantially liquid core portion and a substantially vapor portion, wherein the substantially liquid core portion receives liquid of the phase changing fluid and the substantially vapor portion receives vapor of the phase changing fluid.

29. The system of claim 21, wherein the phase changing fluid comprises an azeotropic blend.

30. The system of claim 21, wherein the melt tray temperature conditioning system comprises an open loop melt tray temperature conditioning system.

31. The system of claim 30, wherein the open loop melt tray temperature conditioning system comprises a refrigerant accumulator, the refrigerant accumulator comprising reflux that is configured to cool a working fluid reservoir, and a feed refrigeration refrigerant accumulator, the feed refrigeration refrigerant accumulator comprising refrigerant that is configured to heat the working fluid reservoir, when the melt tray fluid temperature is below the expected melt tray fluid temperature range.

32. The system of claim 31, wherein the feed refrigeration refrigerant accumulator comprises a pressure-containing vessel.

33. The system of claim 30, wherein the open loop melt tray temperature conditioning system further comprises a working fluid make-up tank that is configured to one of receive the working fluid from the working fluid reservoir and to feed the working fluid to the working fluid reservoir, when the melt tray fluid temperature is below of the expected melt tray fluid temperature range.

* * * * *